(12) United States Patent
Tokunaga

(10) Patent No.: US 12,125,230 B2
(45) Date of Patent: Oct. 22, 2024

(54) INFORMATION PROCESSING DEVICE AND INFORMATION PROCESSING METHOD FOR ESTIMATING LOCATIONS OR POSTURES OF DEVICES BASED ON ACQUIRED ENVIRONMENT INFORMATION

(71) Applicant: SONY CORPORATION, Tokyo (JP)

(72) Inventor: Makoto Daniel Tokunaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 694 days.

(21) Appl. No.: 17/250,468

(22) PCT Filed: Jun. 20, 2019

(86) PCT No.: PCT/JP2019/024436
§ 371 (c)(1),
(2) Date: Jan. 25, 2021

(87) PCT Pub. No.: WO2020/026633
PCT Pub. Date: Feb. 6, 2020

(65) Prior Publication Data
US 2021/0295552 A1    Sep. 23, 2021

(30) Foreign Application Priority Data
Aug. 2, 2018  (JP) .................................. 2018-145533

(51) Int. Cl.
*G06T 7/70*    (2017.01)
*H04W 4/02*   (2018.01)

(52) U.S. Cl.
CPC .............. *G06T 7/70* (2017.01); *H04W 4/023* (2013.01); *H04W 4/026* (2013.01)

(58) Field of Classification Search
None
See application file for complete search history.

(56) References Cited

U.S. PATENT DOCUMENTS 10,339,718 B1 *   7/2019   Kamal ................. H04N 9/3194
10,735,900 B1 *   8/2020   Werner ................. G01S 13/765
(Continued)

FOREIGN PATENT DOCUMENTS

CN    101583969 A    11/2009
CN    104349054 A     2/2015
(Continued)

OTHER PUBLICATIONS

International Search Report and Written Opinion of PCT Application No. PCT/JP2019/024436, issued on Sep. 17, 2019, 11 pages of ISRWO.

*Primary Examiner* — Soo Shin
(74) *Attorney, Agent, or Firm* — CHIP LAW GROUP

(57) ABSTRACT

An information processing device according to the present technology includes a control unit. The control unit estimates a location/posture of a first device detected from a captured image, acquires first environment information of the first device from the detected first device, and generates second environment information on the basis of the estimated location/posture of the first device and the acquired first environment information. This makes it possible to form the network with regard to locations/postures without using a central unit such as a server.

16 Claims, 18 Drawing Sheets

(56) References Cited

U.S. PATENT DOCUMENTS

| | | | | |
|---|---|---|---|---|
| 2005/0001024 A1* | 1/2005 | Kusaka | ................ | G06V 40/16 |
| | | | | 340/5.2 |
| 2010/0097483 A1* | 4/2010 | Icho | ........................ | G06T 7/80 |
| | | | | 348/222.1 |
| 2015/0029350 A1* | 1/2015 | Matsuda | ................ | H04N 23/90 |
| | | | | 348/211.2 |
| 2015/0319563 A1* | 11/2015 | Johnson | ............. | H04W 40/244 |
| | | | | 455/456.3 |
| 2017/0053533 A1* | 2/2017 | Kuroda | ................ | G08G 1/167 |
| 2017/0263122 A1* | 9/2017 | Kamajaya | ............... | H04W 4/44 |
| 2017/0270362 A1* | 9/2017 | Barnehama | ............ | G06F 1/163 |
| 2017/0351470 A1* | 12/2017 | Beaven | ................ | G06F 3/1423 |
| 2018/0121763 A1* | 5/2018 | Surnilla | ............... | G06V 10/809 |
| 2018/0180733 A1* | 6/2018 | Smits | ....................... | G06T 7/521 |

FOREIGN PATENT DOCUMENTS

| | | |
|---|---|---|
| JP | 2015-027052 A | 2/2015 |
| JP | 2016-161675 A | 9/2016 |
| WO | 2008/087974 A1 | 7/2008 |

\* cited by examiner

INFORMATION PROCESSING DEVICE AND INFORMATION PROCESSING METHOD FOR ESTIMATING LOCATIONS OR POSTURES OF DEVICES BASED ON ACQUIRED ENVIRONMENT INFORMATION

CROSS REFERENCE TO RELATED APPLICATIONS

This application is a U.S. National Phase of International Patent Application No. PCT/JP2019/024436 filed on Jun. 20, 2019, which claims priority benefit of Japanese Patent Application No. JP 2018-145533 filed in the Japan Patent Office on Aug. 2, 2018. Each of the above-referenced applications is hereby incorporated herein by reference in its entirety.

TECHNICAL FIELD

The present technology relates to a technology of sharing locations/postures between respective devices.

BACKGROUND ART

Patent Literature 1 listed below discloses an information sharing system including a plurality of clients and a server. Each of the clients has a function of measuring a self location by using the Global Positioning System (GPS) or the like. The server centrally manages these clients.

The information sharing system transmits a location sharing request including a current location of a first client (such as a location measured through the GPS) to the server when a location sharing button on a touchscreen of the first client is operated. In response to the request, the server causes a second client to recognize the location of the first client and causes a touchscreen of the second client to display a location sharing screen (such as a map on which an icon representing the first client is disposed at its center).

CITATION LIST

Patent Literature

Patent Literature 1: JP 2016-161675A

DISCLOSURE OF INVENTION

Technical Problem

The information sharing system according to Patent Literature 1 needs the server that has a central role to share the locations between the plurality of clients. Such a system has a problem that when the server malfunctions, the whole system also malfunctions with regard to sharing of locations.

In view of the circumstance as described above, a purpose of the present technology is to provide a technology such as an information processing device or the like capable of forming a network with regard to locations/postures without using a central unit such as the server.

Solution to Problem

An information processing device according to the present technology includes a control unit.

The control unit estimates a location/posture of a first device detected from a captured image, acquires first environment information of the first device from the detected first device, and generates second environment information on the basis of the estimated location/posture of the first device and the acquired first environment information.

According to the present technology, the control unit first estimates a location/posture of the first device detected from a captured image. Next, the control unit acquires first environment information of the first device from the detected first device. The control unit generates second environment information on the basis of the estimated location/posture of the first device and the acquired first environment information.

Therefore, according to the present technology, a series of observations made by the information processing device forms a network of relative locations/postures. This makes it possible to form the network with regard to locations/postures without using a central unit such as a server.

The first environment information may include a location/posture of a device other than the first device relative to the first device. In addition, the second environment information includes a location/posture of another device relative to an own device.

The first environment information may include a location/posture of a second device detected by the first device. In this case, the control unit may calculate a location/posture of the second device relative to the own device on the basis of the estimated location/posture of the first device and the acquired first environment information.

The control unit may predict a location/posture of a previously detected device that is previously detected as the first device but that is not currently detected. In this case, the second environment information may include the predicted location/posture of the previously detected device.

The first environment information may include a location/posture of a device serving as the previously detected device for the first device. In this case, the control unit may calculate a location/posture of the device serving as the previously detected device for the first device relative to the own device, on the basis of the estimated location/posture of the first device and the acquired first environment information.

The second environment information may include time information associated with a location/posture of the other device relative to the own device. In this case, the control unit may determine whether or not to eliminate the location/posture of the other device relative to the own device from the second environment information on the basis of the time information.

The control unit may integrate two or more locations/postures of another device relative to the own device.

The control unit may determine which of the two or more locations/postures of the other device relative to the own device will be preferentially reflected in an integrated location/posture relative to the own device.

The control unit may make the determination on the basis of the time information.

The control unit may preferentially reflect a location/posture that is relative to the own device and that is associated with new time information, rather than a location/posture that is relative to the own device and that is associated with old time information.

The control unit may associate the integrated location/posture of the own device with a newest piece of time information among pieces of time information associated with the two or more locations/postures relative to the own device.

In the case where the acquired first environment information includes a location/posture of another device relative to the first device but the second environment information does not includes a location/posture of the other device relative to the own device, the control unit may treat the other device as a new device and add the location/posture of the new device relative to the own device into the second environment information.

The control unit may transmit the second environment information to the other device in response to a request from the other device.

The second environment information may include ambient information detected by the other device.

The ambient information may include at least one of temperature information or brightness information.

An information processing method according to the present technology includes estimating a location/posture of a first device detected from a captured image, acquiring first environment information of the first device from the detected first device, and generating second environment information on the basis of the estimated location/posture of the first device and the acquired first environment information.

A program according to the present technology causes a computer to function as a control unit that estimates a location/posture of a first device detected from a captured image, acquires first environment information of the first device from the detected first device, and generates second environment information on the basis of the estimated location/posture of the first device and the acquired first environment information.

Advantageous Effects of Invention

As described above, the present technology makes it possible to provide a technology such as an information processing device or the like capable of forming a network with regard to locations/postures without using a central unit such as a server.

MODE(S) FOR CARRYING OUT THE INVENTION

Hereinafter, embodiments of the present technology will be described with reference to drawings.

First Embodiment

<Entire Configuration of Information Processing Device and Configurations of respective Structural Elements of Information Processing Device>

Figure 1:
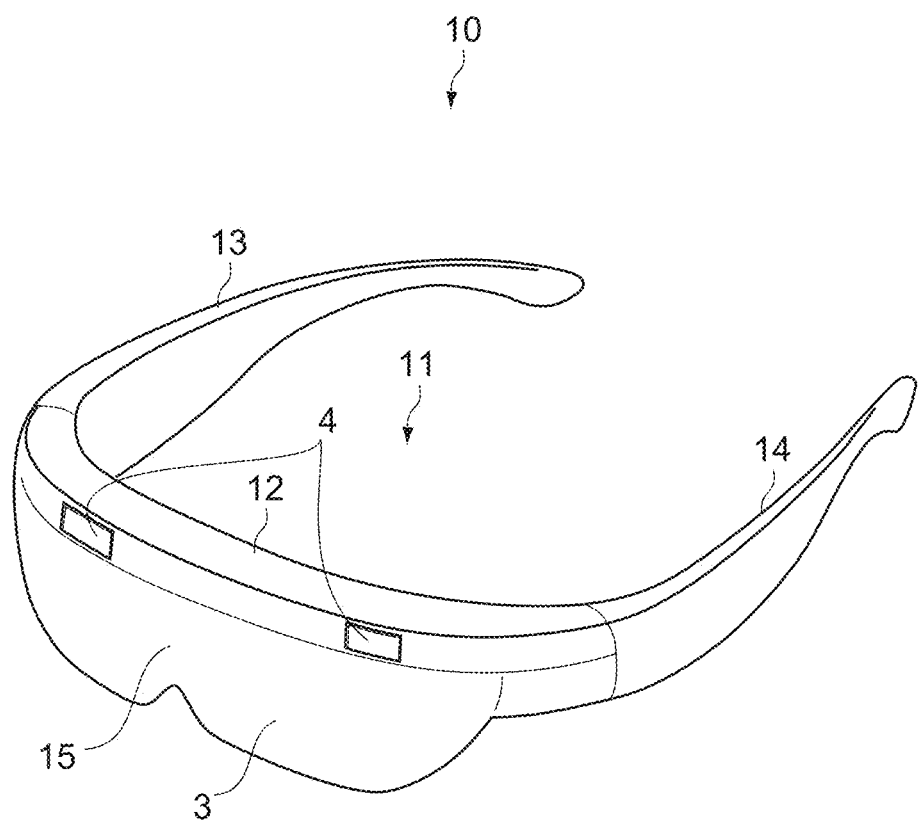
FIG. 1 is a perspective view of an information processing device according to a first embodiment of the present technology.
Figure 2:
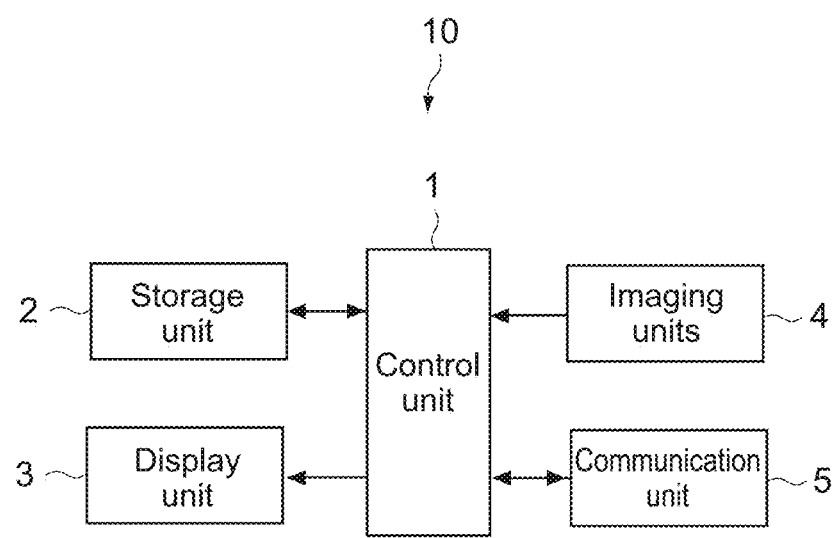
FIG. 2 is a block diagram illustrating an internal configuration of the information processing device.

FIG. 1 is a perspective view of an information processing device 10 according to a first embodiment of the present technology. FIG. 2 is a block diagram illustrating an internal configuration of the information processing device 10.

The information processing system according to the present technology includes a plurality of the information processing devices 10 performing a same process.

FIG. 1 and FIG. 2 illustrate an example in which a head-mounted display 10 is used as an example of the information processing device 10. As illustrated in FIG. 1 and FIG. 2, the information processing device 10 (hereinafter, simply referred to as device 10) includes a head-mounted display main body 11, a control unit 1, a storage unit 2, a display unit 3, imaging units 4, and a communication unit 5.

The head-mounted display main body 11 is used while being worn on a head of a user. The head-mounted display main body 11 includes a front unit 12, a right temple unit 13 provided on a right side of the front unit 12, a left temple unit 14 provided on a left side of the front unit 12, and a glass unit 15 attached below the front unit 12.

The display unit 3 is provided on a front surface of the glass unit 15. The display unit 3 achieves augmented reality (AR) display of a virtual object under the control of the control unit 1. The AR display means display of the virtual object in such a manner that the user perceives the virtual object as if the virtual object were a real object present in a real space. Note that, in the descriptions about the present embodiment, the present technology is applied to the AR display. However, it is also possible to apply the present technology to virtual reality (VR) display.

In the present embodiment, the display unit 3 is a see-through display unit 3 (to achieve the AR display). Alternatively, the display unit 3 may be a display unit 3 that is not see-through (in a case of the VR display). Alternatively, the display unit 3 may be switchable between the see-through mode and the non see-through mode.

The imaging unit 4 is a camera, for example. The imaging unit 4 includes an image sensor such as a charge coupled device (CCD) sensor or a complementary metal oxide semiconductor (CMOS) sensor, and an optical system such as an imaging lens.

The imaging units 4 are provided on an outer surface of the front unit 12 in such a manner that the imaging unit 4 faces outward. The imaging unit 4 captures an image of objects that are present along the line of sight of the user, and outputs image information obtained through the image capturing to the control unit 1. Note that, the number of imaging units 4 may be one, and is not specifically limited.

Images acquired by the imaging units 4 are used by the control unit 1 to estimate a location/posture of the own device 10. In addition, the images are used for estimating (or predicting) a location/posture of another device 10 that is different from the own device 10. Note that, the device 10 may further include additional sensors such as an inertial sensor and a Global Positioning System (GPS) sensor to estimate a location/posture of the own device 10 or estimate (or predict) a location/posture of the other device 10.

The imaging units 4 may further include additional cameras for capturing images of eyes of the user. These cameras are provided on an inner surface side of the front unit 12 in such a manner that the imaging units 4 face inward. The images of the eyes captured by the cameras may be used for estimating lines of sight of the eyes, for example. Note that, the imaging units 4 may include a time-of-flight (ToF) sensor, a depth sensor, or the like.

The communication unit 5 establishes wired or wireless (such as Wireless Fidelity (Wi-Fi) or light fidelity (Li-Fi)) communication with the other device 10.

The control unit 1 includes a central processing unit (CPU) or the like. The control unit 1 performs various computations on the basis of various kinds of programs stored in the storage unit 2, and integrally controls respective structural elements of the device 10. Note that, details of processes performed by the control unit 1 will be described later in paragraphs related to description of operation.

The storage unit 2 includes non-volatile memory that stores various kinds of data and various kinds of programs necessary for the processes performed by the control unit 1, and volatile memory used as a workspace for the control unit 1. Note that, the various kinds of program may be read from a portable recording medium such as an optical disc or semiconductor memory, or may be downloaded from a server apparatus.

<Description of Operation>

Figure 3:
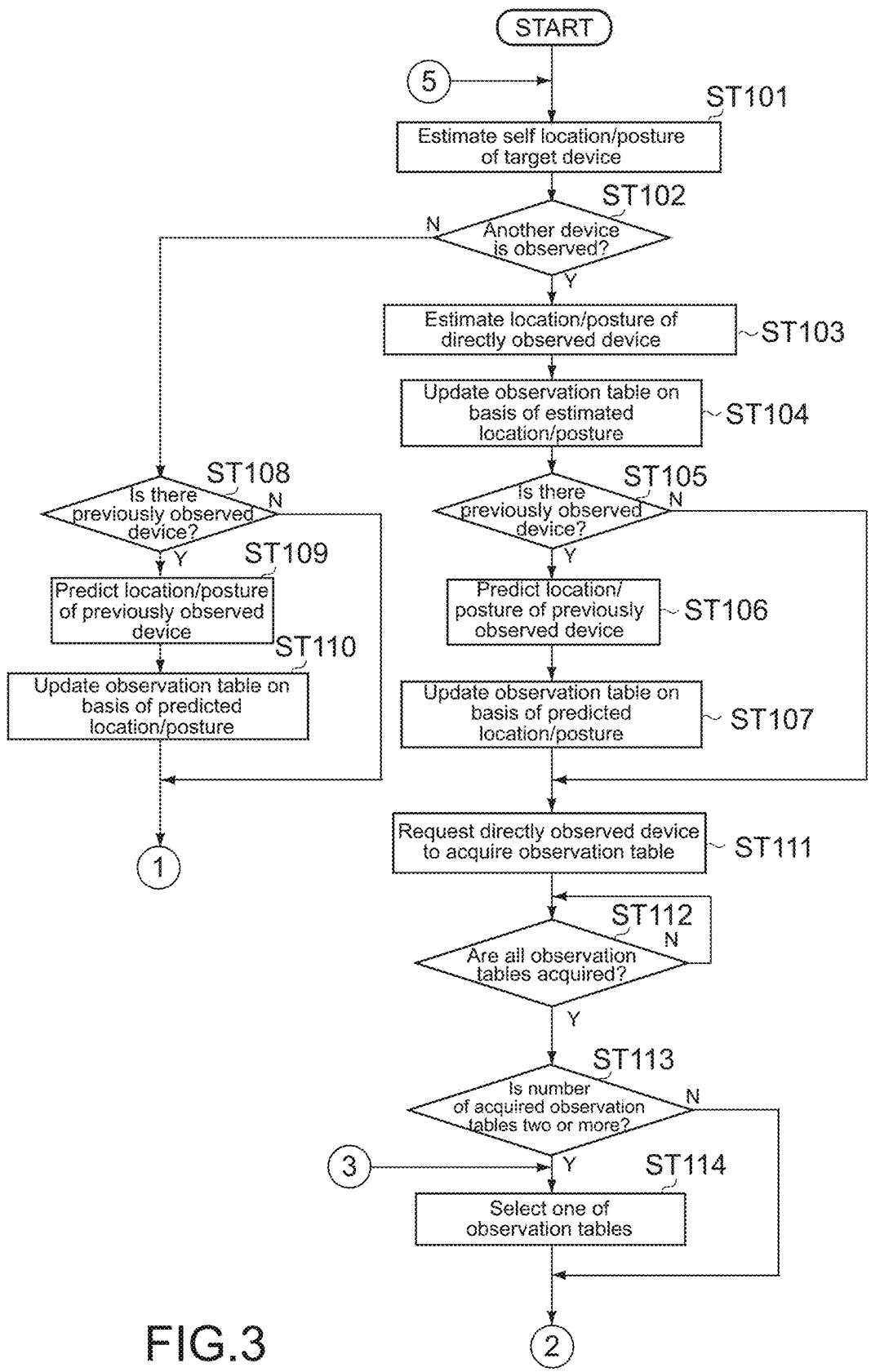
FIG. 3 is a flowchart illustrating processes performed by a control unit.
Figure 4:
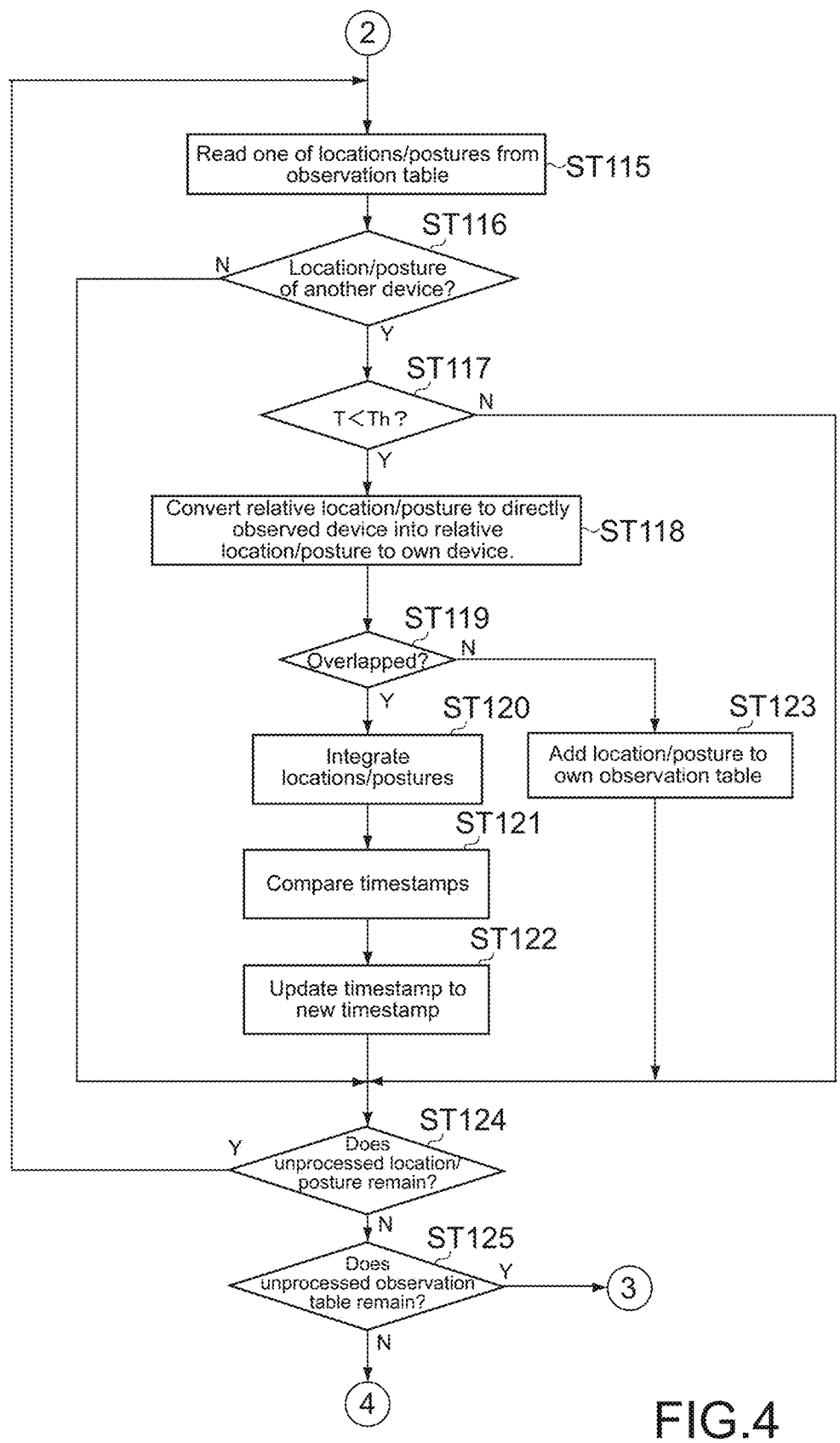
FIG. 4 is a flowchart illustrating processes performed by the control unit.
Figure 5:
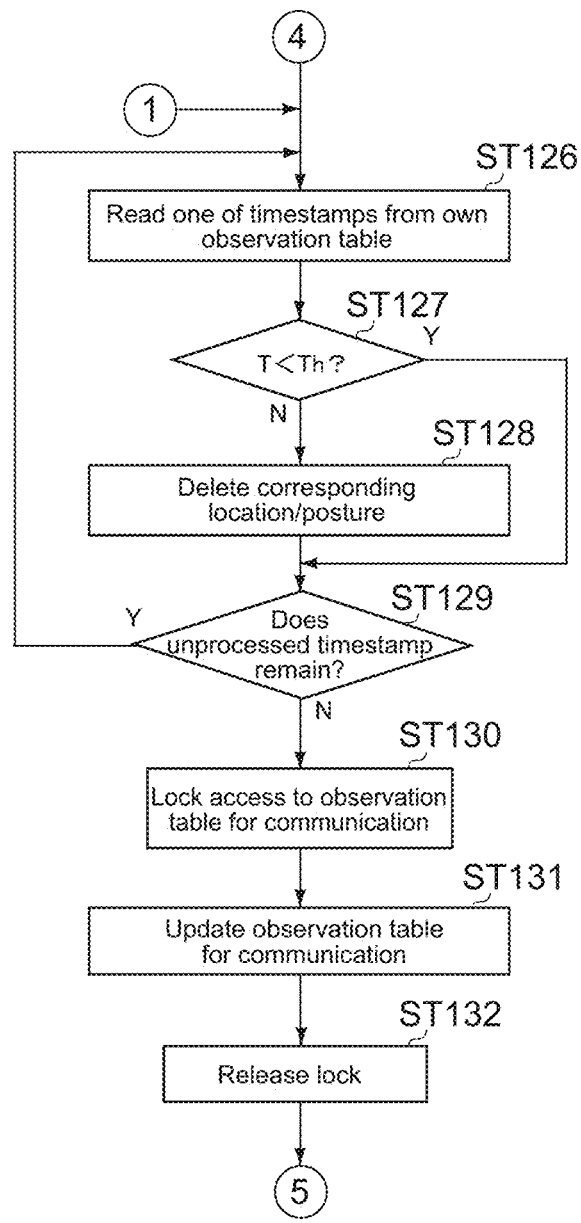
FIG. 5 is a flowchart illustrating processes performed by the control unit.

Next, processes performed by the control unit 1 will be described in detail. FIG. 3 to FIG. 5 are flowcharts illustrating processes performed by the control unit 1. FIG. 6 to FIG. 9 are diagrams illustrating locations of a plurality of users wearing the information processing devices 10 and fields of view (indicated by broken lines) of the imaging units 4 at certain moments.

Figure 6:
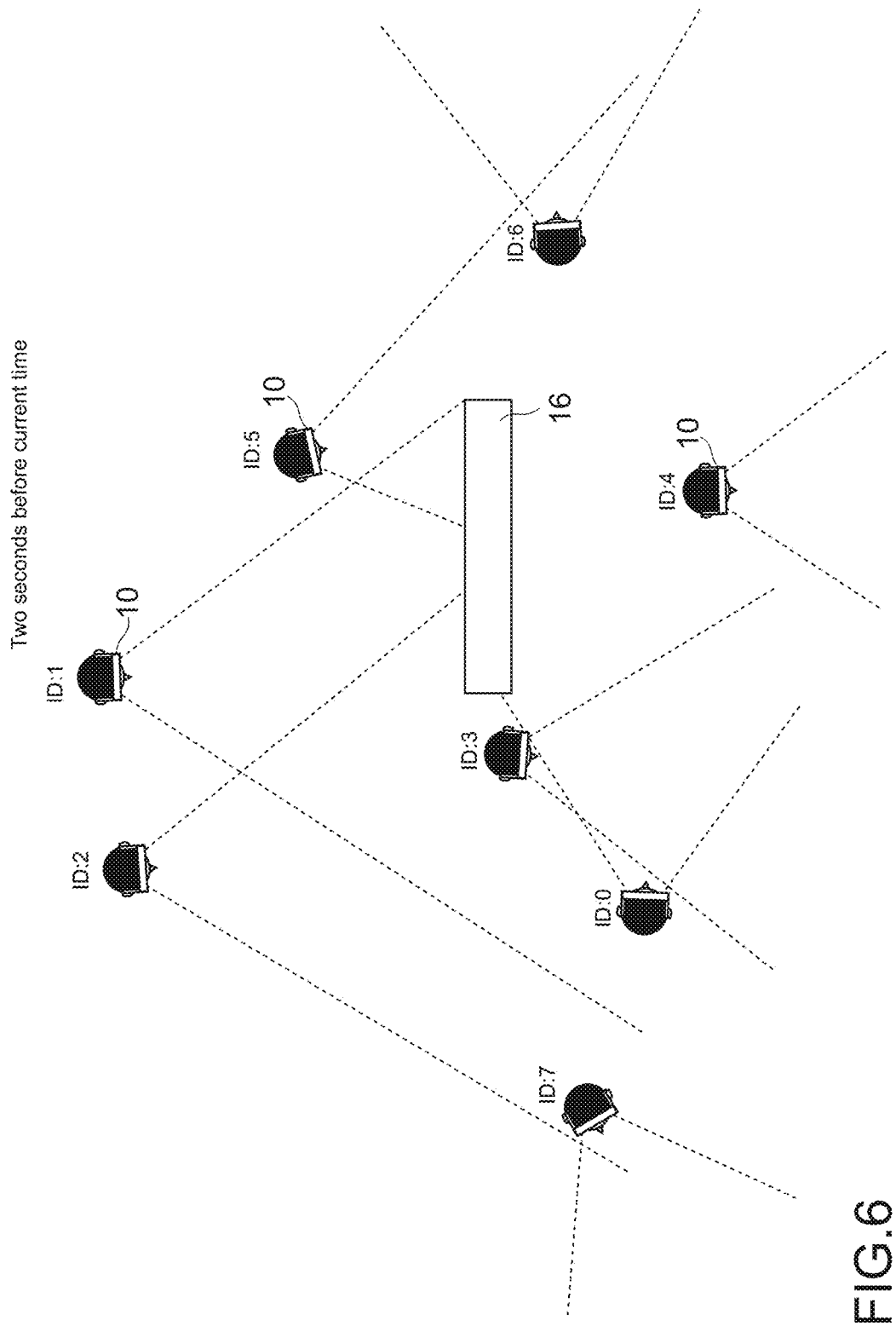
FIG. 6 is a diagram illustrating locations of a plurality of users wearing the information processing devices and fields of view of imaging units at a certain moment.
Figure 7:
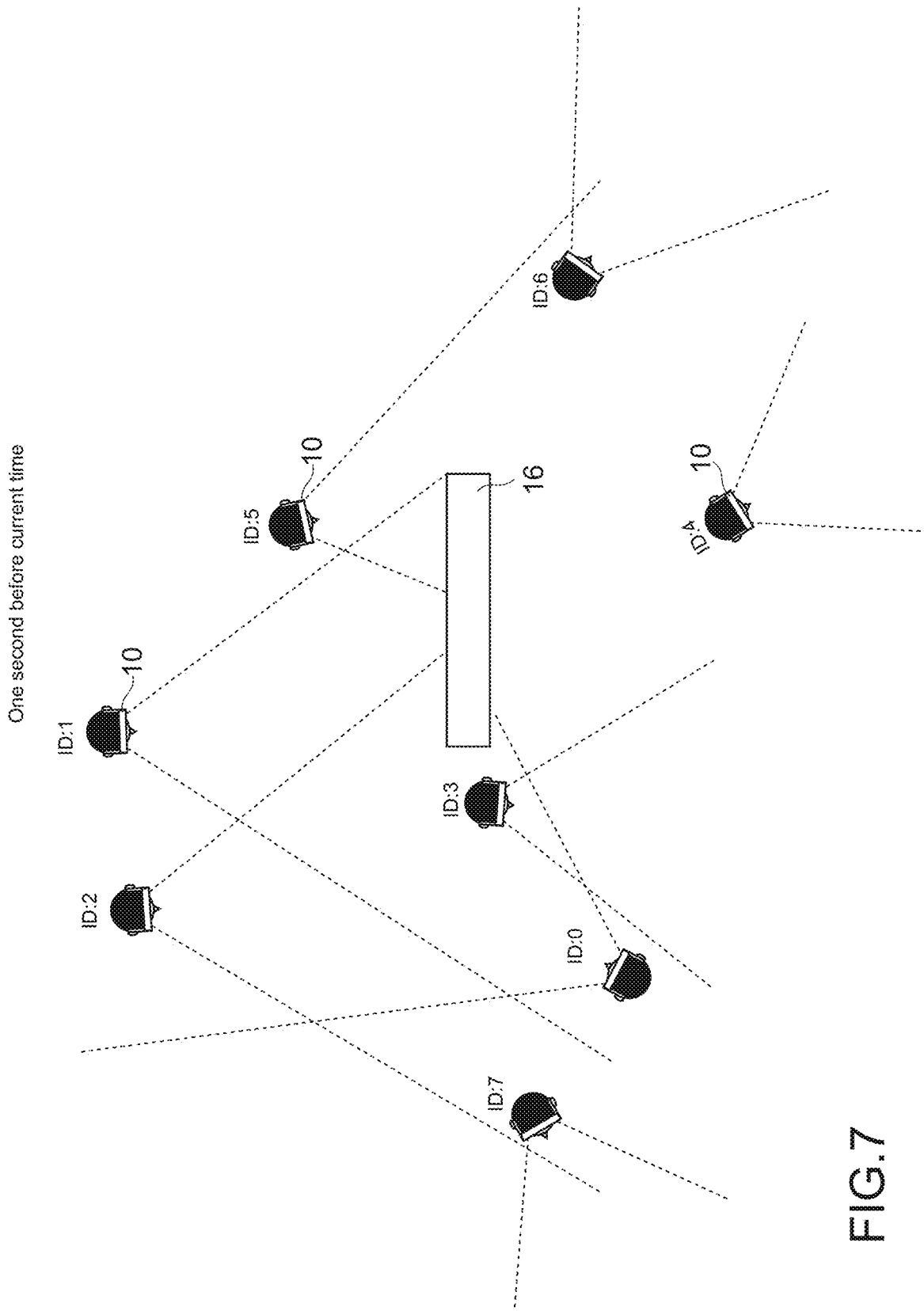
FIG. 7 is a diagram illustrating locations of the plurality of users wearing the information processing devices and fields of view of the imaging units at a certain moment.
Figure 8:
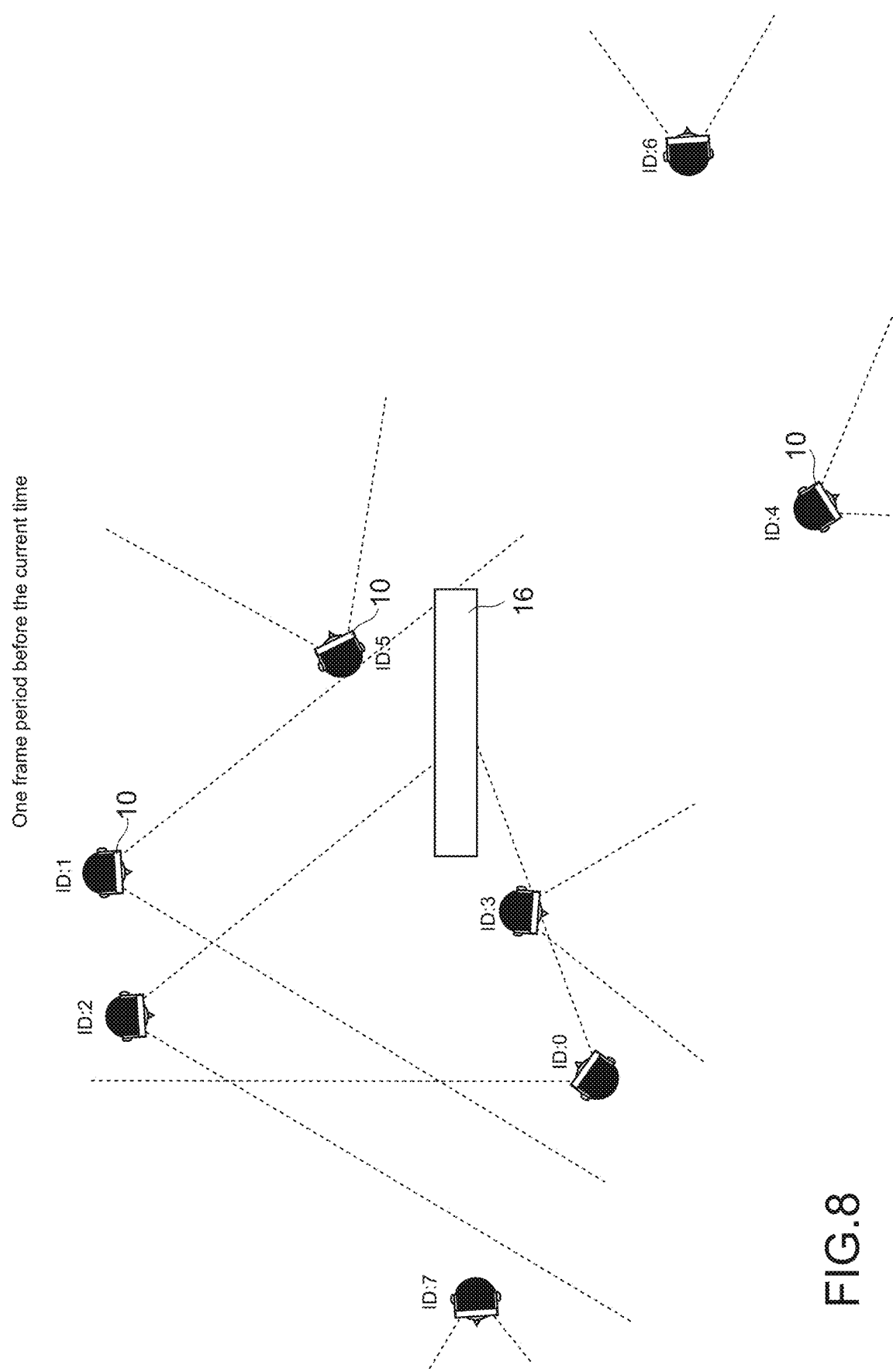
FIG. 8 is a diagram illustrating locations of the plurality of users wearing the information processing devices and fields of view of the imaging units at a certain moment.
Figure 9:
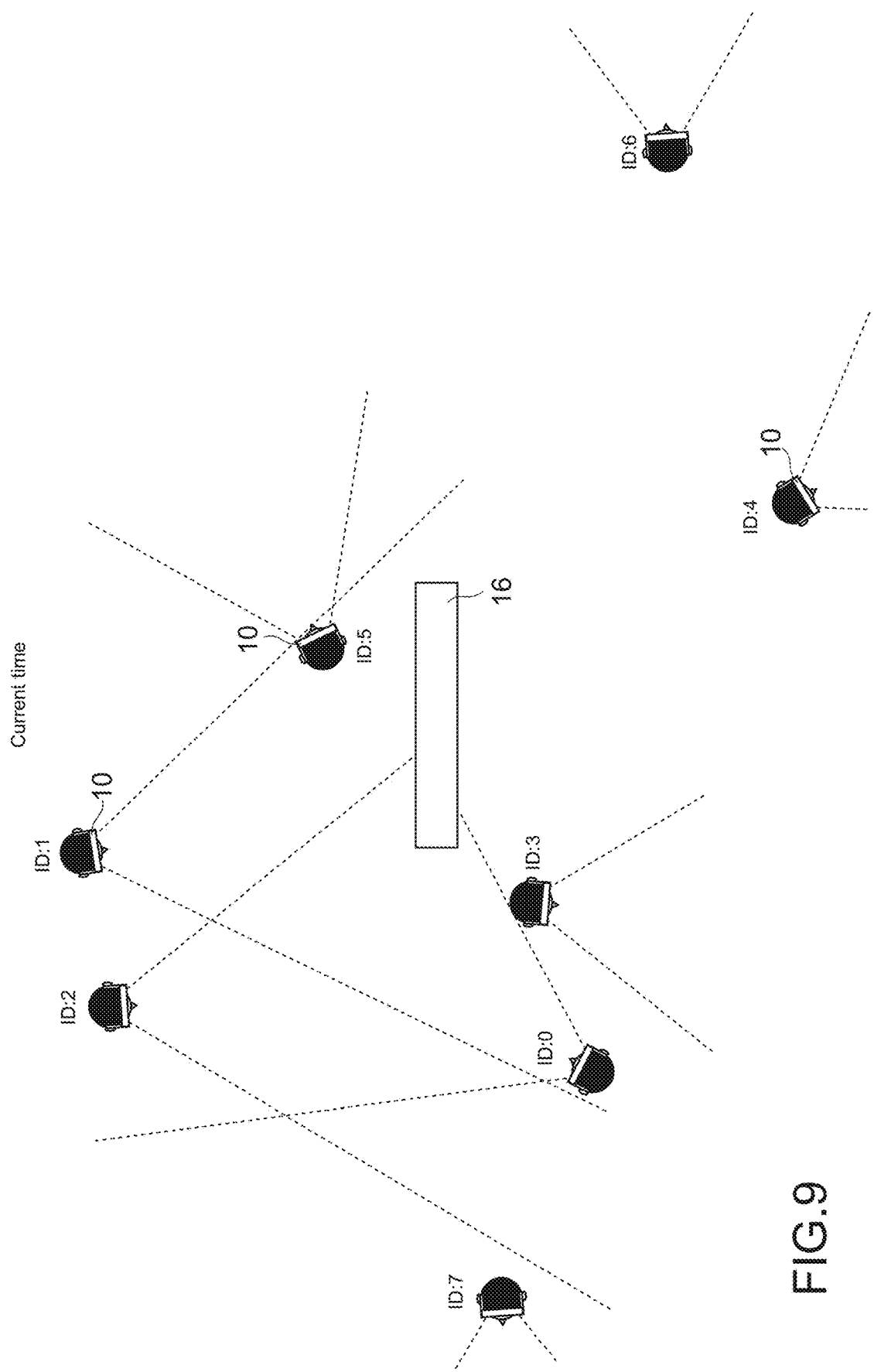
FIG. 9 is a diagram illustrating locations of the plurality of users wearing the information processing devices and fields of view of the imaging units at a certain moment.

Note that, FIG. 6 illustrates locations of respective users (locations of respective devices 10) at two seconds before current time, and FIG. 7 illustrates locations of the respective users (locations of the respective devices 10) at a second before the current time. In addition, FIG. 8 illustrates locations of the respective users (locations of the respective devices 10) in a frame period before the current time (time taken for the imaging unit 4 to capture an image for one frame: reciprocal of frame rate). In addition, FIG. 9 illustrates locations of the respective users (locations of the respective devices 10) at the current time.

Each of the users illustrated in FIG. 6 to FIG. 9 is capable of wearing the device 10 and freely moving around inside and outside of a building. Virtual objects are displayed in the AR manner at the locations of other users (other devices 10) viewed through the display unit 3 of the device 10. The devices 10 according to the present embodiment can be used for various purposes. For example, the devices 10 can be used for recreation like airsoft, a party, and the like.

In the case where the devices 10 are used for the airsoft, for example, marks for discriminating friends from foes, visual effects of hitting a bullet, and the like are displayed as virtual objects at locations of other users (other devices 10) in the AR manner. Alternatively, in the case where the devices 10 are used for a party, texts of names of other users and the like are displayed as virtual objects at location of the other users (other devices 10) in the AR manner.

Note that, in general, the devices 10 according to the present embodiment can be used for any purposes as long as the devices 10 are used for a purpose of displaying some kinds of virtual objects related to other users (other devices 10) in the AR (or VR) manner or the like.

Here, meanings of wording used herein will be listed below.

1. Target Device:

Any one of the plurality of devices included in the information processing system.

In the present embodiment, the target device corresponds to an own device.

2. Another Device/Other Devices:

A device or devices other than the target device among the plurality of devices included in the information processing system.

3. Directly Observed Device:

A device that is directly observed by the target device among the other devices. In the present embodiment, the directly observed device corresponds to a first device detected from a captured image.

4. Indirectly Observed Device:

A device that is observed by the directly observed device among the other devices.

In the present embodiment, the indirectly observed device corresponds to a second device detected by the first device.

Note that, sometimes the imaging units 4 of the target device may directly observe the indirectly observed device (second device) that has been observed by the directly observed device (first device). In this case, the indirectly observed device (second device) also serves as the directly observed device (first device).

5. Network:

A network contains a group of device including the target device, the directly observed device, and the indirectly observed device.

For example, the network contains a group of devices including devices (A) to (E) in the case where the device (A) observes the device (B), the device (B) observes the device (C), the device (C) observes the device 10(D), and the device (D) observes the device (E) (in other words, the series of "observations" forms the network).

[1. Self Location Estimation]

With reference to FIG. 3, the control unit 1 first estimates a self location/posture of the target device 10 itself by using a method such as simultaneous localization and mapping (SLAM) on the basis of image information acquired by the imaging units 4 (Step 101). The estimated location/posture includes six-dimensional information (x, y, z, yaw, pitch, and roll of a Cartesian coordinate system), for example. The estimated self location/posture is stored in the storage unit 2 as the current self location/posture.

[2. Estimation of Location/Posture of Directly Observed Device]

Next, the control unit 1 determines whether the imaging units 4 have observed at least one of the plurality of other devices 10 (whether a captured image shows anther device 10 recognizably) (Step 102).

The control unit 1 proceeds to Step 108 in the case where none of the other devices 10 is observed (NO in Step 102).

On the other hand, in the case where at least one of the other devices 10 is observed (YES in Step 102), the control unit 1 proceeds to next Step 103. In Step 103, the control unit 1 estimates a relative location/posture of the directly observed device 10 to the target device 10 through object recognition, tracking, or another method on the basis of image information acquired by the imaging units 4 (information including at least a current image). The estimated location/posture includes six-dimensional information (x, y, z, yaw, pitch, and roll of a Cartesian coordinate system), for example.

Next, the control unit 1 updates an observation table on the basis of the estimated location/posture of the directly observed device 10 (Step 104). In the present embodiment, the observation table corresponds to environment information including locations/postures of devices other than the target device relative to the target device. Environment information generated by the own device, that is, environment information including the locations/postures of the other devices relative to the own device corresponds to second environment information. On the other hand, environment information generated by the directly observed device (first device), that is, environment information including locations/postures of devices other than the directly observed device (first device) relative to the directly observed device (first device) corresponds to first environment information.

[2-1. Detailed Examples of Estimation and Update]

Figure 10:
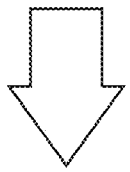
FIG. 10 is a diagram illustrating an example of update of an observation table based on estimated locations/postures of directly observed devices.

FIG. 10 is a diagram illustrating an example of update of an observation table based on estimated locations/postures of directly observed devices. The example illustrated in FIG. 10 shows a situation of updating an observation table of a device 10 with an ID: 0. Note that, the observation table of the device 10 with the ID: 0 corresponds to the second environment information.

Note that, an example of an observation table obtained before estimating the locations/postures of the directly observed devices 10 is illustrated in the top of FIG. 10, and an example of an observation table obtained after estimating the locations/postures of the directly observed devices 10 is illustrated in the bottom of FIG. 10.

As illustrated in FIG. 10, in the observation tables, IDs for identifying respective other devices 10 (identification information), pieces of location/posture information indicating locations/postures of the other devices 10, and timestamps indicating last times when the other devices 10 have been observed (time information) are associated with each other.

The location/posture information is information on relative locations/postures of the other devices 10 to the target device 10 (the device 10 with the ID: 0). For example, the location/posture information is the six-dimensional information (x, y, z, yaw, pitch, and roll of a Cartesian coordinate system).

The timestamps indicate last times when the corresponding other devices 10 have been observed (by the target device 10 or yet other devices 10 that form the network with the target device 10).

For example, a timestamp indicates an actual time when a corresponding other device 10 has been observed such as "HH:mm:ss.SSS". Note that, the timestamp may be a difference T between a current time and the time when the corresponding other device 10 has been observed.

Note that, FIG. 10 uses descriptions such as "now", "last frame", "T<2 sec", and "T≥2 sec" instead of actual times such as "HH:mm:ss.SSS" to facilitate understanding (the same applies to FIG. 11 and FIG. 12 to be described later). In the present embodiment, the timestamp corresponds to time information associated with a location/posture of another device relative to the own device.

Here, the wording "now" means that a last time when a corresponding other device 10 has been observed is a current time (a difference T between the current time and the last time when the corresponding other device 10 has been observed is zero seconds).

In addition, the wording "last frame" means that a last time when a corresponding other device 10 has been observed is a frame period before the current time (time taken for the imaging units 4 to acquire an image for one frame: reciprocal of frame rate) (a difference T between the current time and the last time when the corresponding other device 10 has been observed is one frame period).

In addition, the wording "T<2 sec" means that a difference T between the current time and a last time when a corresponding other device 10 has been observed is less than two seconds (and more than one frame period).

In addition, the wording "T≥2 sec" means that a difference T between the current time and a last time when a corresponding other device 10 has been observed is two seconds or more.

Here, the time period of two seconds, which is compared with the difference T, serves as a threshold Th for determining whether to reflect a location/posture acquired from another device 10 in the own observation table (see Step 117 in FIG. 4). In addition, the time period of two seconds, which is compared with the difference T, also serves as the threshold Th for determining whether to delete (eliminate) old information when information on a location/posture of a corresponding device 10 becomes old (see Step 127 in FIG. 5).

With reference to FIG. 8, the device 10 with the ID: 0 directly observes devices 10 with IDs: 1, 2, and 3 by using its imaging units 4 in a frame period before a current time. Therefore, as illustrated in the top of FIG. 10, relative locations/postures X1', X2', X3' of the devices 10 with the IDs: 1, 2, and 3 to the device 10 with the ID: 0 are associated with the timestamp "last frame" in an observation table of the device 10 with the ID: 0 (before estimating current locations/postures).

With reference to FIG. 6, the device 10 with the ID: 0 directly observes devices 10 with IDs: 4 and 6 by using its imaging units 4 at two seconds before the current time. Immediately after that (after one frame period elapses from two seconds before the current time), the devices 10 with the IDs: 4 and 6 get out of the field of view of the imaging units 4 of the device 10 with the ID: 0, and this makes it impossible for the device 10 with the ID: 0 to observe the devices 10 with the IDs: 4 and 6.

Next, as illustrated in FIG. 7 and FIG. 8, the device 10 with the ID: 0 does not directly observe the devices 10 with IDs: 4 and 6 by using its imaging units 4 until one frame period before the current time. In addition, other devices 10 (with IDs: 1, 2, 3, and 7) forming the network with the device 10 with the ID: 0 do not directly observe the devices 10 with the IDs: 4 and 6 by using their imaging units 4.

Therefore, as illustrated in the top of FIG. 10, relative locations/postures X4' and X6' of the devices 10 with the IDs: 4 and 6 to the device 10 with the ID: 0 are associated with the timestamp "T≥2 sec" in the observation table of the device 10 with the ID: 0 (before estimating current locations/postures), and this observation table is stored in the storage unit 2.

With reference to FIG. 6 and FIG. 7, the device 10 with the ID: 2 directly observes the device 10 with the ID: 7 until a second before the current time. However, immediately after that (after one frame period elapses from a second before the current time), the devices 10 with the ID: 7 gets out of the field of view of the imaging units 4 of the device 10 with the ID: 2, and this makes it impossible for the device 10 with the ID: 2 to observe the device 10 with the ID: 7. Next, as illustrated in FIG. 8, the device 10 with the ID: 2 does not directly observe the device 10 with the ID: 7 in a frame period before the current time.

Here, the device 10 with the ID: 2 starts predicting a location/posture of the device 10 with the ID: 7 (to be described later with reference to Step 105 to Step 107 in FIG. 3) when observation of the device 10 with the ID: 7 is stopped (after one frame period elapses from a second before the current time).

In addition, as illustrated in FIG. 7 and FIG. 8, the device 10 with the ID: 0 directly observes the device 10 with the ID: 2 by its imaging units 4 from a second before the current time. Accordingly, the device 10 with the ID: 0 has already acquired, from the device 10 with the ID: 2, the location/posture of the device 10 with the ID: 7 relative to the device 10 with the ID: 2. The location/posture is predicted by the device 10 with the ID: 2. Accordingly, the device 10 with the ID: 0 has already held the location/posture of the device 10 with the ID: 7 relative to the device 10 with the ID: 0 (to be described later with reference to Step 111 in FIG. 3 to Step 125 in FIG. 4).

Therefore, as illustrated in the top of FIG. 10, relative location/posture X7' of the device 10 with the ID 7 to the device 10 with the ID: 0 is associated with the timestamp "T<2 sec" in the observation table of the device 10 with the ID: 0 (before estimating current locations/postures), and this observation table is stored in the storage unit 2.

With reference to FIG. 9, the device 10 with the ID: 0 directly observes the devices 10 with IDs: 1 and 2 by using its imaging units 4 at the current time. Accordingly, in this case, the control unit 1 of the device 10 with the ID: 0 estimates current locations/postures X1 and X2 of the devices 10 with the IDs: 1 and 2 serving as the directly observed devices 10, on the basis of image information (information including at least a current image) (Step 103). Next, as illustrated in FIG. 10, the control unit 1 of the device 10 with the ID: 0 overwrites the locations/postures X1' and X2' with the locations/postures X1 and X2 to update the locations/postures (Step 104).

Note that, in FIG. 10, the locations/postures X1 and X2 are described as locations/postures X1(estimated) and X2(estimated) to facilitate understanding that the locations/postures X1 and X2 are "estimated" (not "predicted") (the same applies to FIG. 11 to FIG. 12 to be described later).

Here, when updating the locations/postures, the control unit 1 of the device 10 with the ID: 0 of the location/posture also updates corresponding timestamps. Specifically, the control unit 1 of the device 10 with the ID: 0 changes the timestamps corresponding to the devices 10 with the IDs: 1 and 2 from "last frame" (a frame period before the current time) to "now" (current time) (this is because the devices 10 with the IDs: 1 and 2 are directly observed at the current time).

With reference to FIG. 8 and FIG. 9, although the device 10 with the ID: 0 directly observes the device 10 with the ID: 3 in a frame period before the current time, the device 10 with the ID: 0 does not directly observe the device 10 with the ID: 3 at the current time. Therefore, as illustrated in the bottom of FIG. 10, the location/posture X3' of the device 10 with the ID: 3 is not updated and the timestamp "last frame" remains without being updated in the observation table.

With reference to FIG. 6 to FIG. 9, although the device 10 with the ID: 0 directly observes the devices 10 with the IDs: 4 and 6 at two seconds before the current time, the device 10 with the ID: 0 does not directly observe the devices 10 with the IDs: 4 and 6 at the current time. Therefore, as illustrated in the bottom of FIG. 10, the locations/postures X4' and X6' of the devices 10 with the IDs: 4 and 6 are not updated and the timestamp "T≥2 sec" remains without being updated in the observation table.

In addition, with reference to FIG. 6 to FIG. 9, the device 10 with the ID: 0 does not directly observe the device 10 with the ID: 7 at the current time (although the device 10 with the ID: 2, which forms the network with the device 10 with the ID: 0 from a second before the current time, observes the device 10 with the ID: 7 at a second before the current time). Therefore, as illustrated in the bottom of FIG. 10, the location/posture X7' of the device 10 with the ID: 7 is not updated and the timestamp "T<2 sec" remains without being updated in the observation table.

[3. Prediction of Location/Posture of Previously Observed Device]

Returning to FIG. 3, the control unit 1 proceeds to next Step 105 after updating the observation table on the basis of the estimated locations/postures. In Step 105, the control unit 1 determines whether there is a previously observed device 10.

Here, the previously observed device 10 (first previously observed device 10) means another device 10 that satisfies conditions (1) and (2) listed below.

(1) Being directly observed by the target device 10 or another device 10 that forms the network with the target device 10 in the past (within a predetermined period of time (two seconds) before the current time).

(2) Not being directly observed by the target device 10 at the current time (either being observed or not being observed by another device 10 that forms the network with the target device 10 at the current time).

Note that, in the present embodiment, the previously observed device 10 is another device 10 that is included in the observation table but that is not a directly observed device 10 (whose location/posture is not estimated). Therefore, in the present embodiment, the control unit 1 determines whether or not there is the previously observed device 10 with reference to the observation table.

In the case where there is the previously observed device 10 (YES in Step 105), the control unit 1 predicts a location/posture of the previously observed device 10 on the basis of past information (such as past image or past location/ posture). Note that, a timestamp associated with a corresponding location/posture may be used for this prediction (for example, in the case where a difference between the current time and a time indicated by the timestamp is a second, a location/posture after a second (current location/posture) is predicted from a location/posture before a second).

Here, in this specification, the wording "estimation" has a different meaning from the wording "prediction". The wording "estimation" means that a current location/posture of a device 10 is estimated on the basis of at least current information (such as current image). On the other hand, the wording "prediction" means that a current location/posture of a device 10 is predicted on the basis of past information (such as past image or past location/posture) in the case where there is no current information.

After predicting the location/posture of the previously observed device 10, the control unit 1 then updates the observation table on the basis of the predicted location/posture of the previously observed device (Step 106).

Note that, among the previously observed devices 10, a device that has been detected as a directly observed device (first device) in the past but that is not currently detected serves as the previously detected device. It is possible to predict a location/posture of the previously detected device on the basis of past information.

[3-1. Detailed Example of Prediction and Update]

Figure 11:
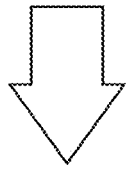
FIG. 11 is a diagram illustrating a situation where an observation table is updated on the basis of predicted locations/postures of previously observed devices.

FIG. 11 is a diagram illustrating a situation of updating an observation table on the basis of predicted locations/postures of previously observed devices 10. The example illustrated in FIG. 11 shows a situation of updating an observation table of the device 10 with the ID: 0. Note that, an example of an observation table obtained before predicting locations/postures is illustrated in the top of FIG. 11, and an example of an observation table obtained after predicting locations/postures is illustrated in the bottom of FIG. 11.

As illustrated in FIG. 6 to FIG. 9, although the device 10 with the ID: 0 has directly observed the devices 10 with the IDs: 3, 4, and 6 in the past (within two seconds before the current time), the device 10 with the ID: 0 does not directly observe the devices 10 with the IDs: 3, 4, and 6 at the current time.

In addition, as illustrated in FIG. 6 to FIG. 9, although the device 10 with the ID: 2, which forms the network with the device 10 with the ID: 0, has directly observed the device 10 with the ID: 7 in the past (within two seconds before the current time), the device 10 with the ID: 0 does not directly observe the device 10 with the ID: 7 at the current time.

Therefore, as illustrated in the top of FIG. 11, the observation table includes the locations/postures X3', X4', X6', and X7' of the devices 10 with the IDs: 3, 4, 6, and 7 as locations/postures of previously observed devices 10.

Accordingly, in this case, the control unit 1 of the device 10 with the ID: 0 predicts current locations/postures X3, X4, X6, and X7 of the devices 10 with the IDs: 3, 4, 6, and 7 on the basis of the past information (such as past images or past locations/postures) (Step 106). Next, as illustrated in the bottom of FIG. 11, the control unit 1 of the device 10 with the ID: 0 overwrites the locations/postures X3', X4', X6', and X7' with the predicted locations/postures X3, X4, X6, and X7 to update the locations/postures (Step 107).

Note that, in FIG. 11, the locations/postures X3, X4, X6, and X7 are described as locations/postures X3(predicted), X4 (predicted), X6 (predicted), and X7 (predicted) to facilitate understanding that the locations/postures X3, X4, X6, and X7 are "predicted" (not "estimated") (the same applies to FIG. 12 to be described later).

Note that, when updating the locations/postures, the control unit 1 of the device 10 with the ID: 0 does not update the corresponding timestamps and leaves them as they are (although the control unit 1 updates the timestamps in the case of "estimation"). In other words, the timestamps remain as they are because the devices 10 with the IDs: 3, 4, 6, and 7 are not directly observed at the current time.

[3-2. Prediction in Case where there is No Directly Observed Device]

Returning to FIG. 3, in Step 102, the control unit 1 performs processes in Step 108 to Step 110 in the case where none of the other devices 10 is observed (NO in Step 102). In Step 108 to Step 110, the control unit 1 performs processes similar to Step 105 to Step 107.

In other words, the control unit 1 determines whether there is a previously observed device 10 in Step 108. In the case where there is the previously observed device 10 (YES in Step 108), the control unit 1 predicts a location/posture of the previously observed device 10 in Step 109. After the prediction, the control unit 1 updates the observation table on the basis of the predicted location/posture of the other device 10 in Step 110. Next, the control unit 1 proceeds to Step 126 (see FIG. 5).

In other words, even in the case where none of the other devices 10 is observed (there is no directly observed device 10), a location/posture of a previously observed device 10 is predicted from past information and the observation table is updated on the basis of the prediction if there is the previously observed device 10.

After the observation table is updated in Step 107, the control unit 1 proceeds to next Step 111. In a similar way, the control unit 1 proceeds to next Step 111 in the case where there is no previously observed device 10 in Step 105 (NO in Step 105).

[4. Acquisition of Observation Table from Directly Observed Device 10]

In Step 111, the control unit 1 transmits a request to acquire the observation table to the directly observed devices 10. Note that, each of the devices 10 holds information on an observation table as communication data (see Step 131 in FIG. 5 to be described later). After transmitting the requests to acquire the observation tables, the control unit 1 then determines whether all the requested observation tables are acquired (Step 112). Note that, the observation tables of the directly observed devices 10 corresponds to the first environment information.

Note that, the acquired information on the observation tables includes the IDs for identifying respective devices 10 (identification information), pieces of location/posture information indicating relative locations/postures to a device 10 (values estimated or predicted by a corresponding device 10), and timestamps indicating last times when the devices 10 have been observed (time information). Note that, in addition to the information on the observation tables, information on self locations estimated by the directly observed devices 10 may also be acquired.

Figure 12:
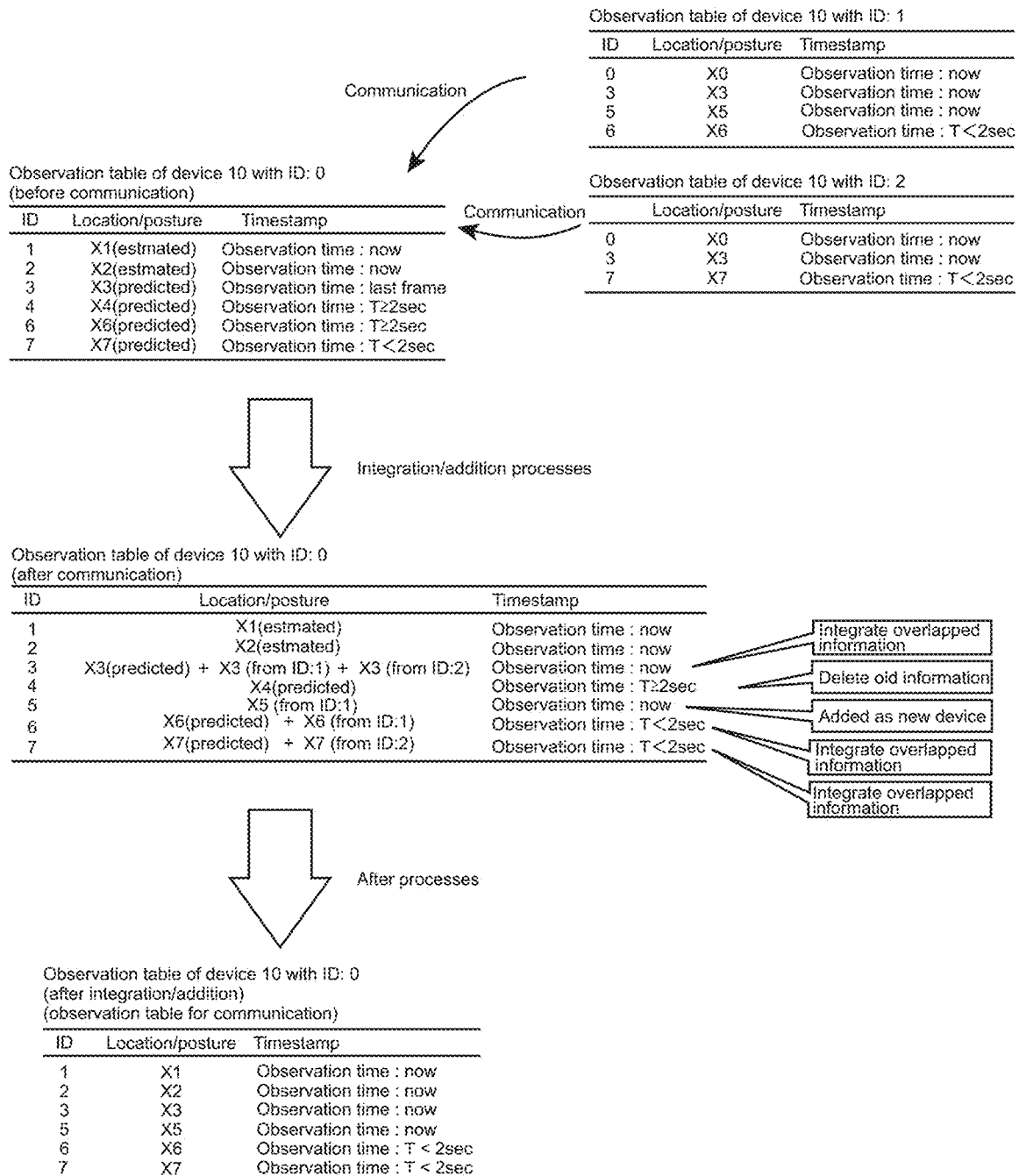
FIG. 12 is a diagram illustrating a situation where an observation table is acquired from directly observed devices through communication.

FIG. 12 is a diagram illustrating a situation where observation tables are acquired from directly observed devices 10 through communication. In the example illustrated in FIG. 12, the device 10 with the ID: 0 directly observes the devices 10 with the IDs: 1 and 2, and information on observation tables are acquired from the devices 10 with the IDs: 1 and 2 (directly observed devices 10) through communication.

With reference to FIG. 9, the device 10 with the ID: 1 directly observes the devices 10 with IDs: 0, 3, and 5 at the current time. Therefore, as illustrated in FIG. 12, the observation table of the device 10 with the ID: 1 stores relative locations/postures X0, X3, and X5 of the devices 10 with the IDs: 0, 3, and 5 to the device 10 with the ID: 1 in association with the timestamp "now".

In addition, as illustrated in FIG. 6 to FIG. 9, although the device 10 with the ID: 5 has directly observed the device 10 with the ID: 6 until a second before the current time, the device 10 with the ID: 5 does not directly observe the device 10 with the ID: 6 at the current time. Accordingly, the device 10 with the ID: 5 predicts a location/posture of the device 10 with the ID: 6 at the current time on the basis of the past information.

In addition, as illustrated in FIG. 9, the device 10 with the ID: 1 observes the device 10 with the ID: 5 at the current time. Accordingly, the device 10 with the ID: 1 has already acquired the location/posture of the device 10 with the ID: 6 (a value predicted by the device 10 with the ID: 5) from the device 10 with the ID: 5.

Therefore, as illustrated in FIG. 12, the observation table of the device 10 with the ID: 1 stores a relative location/posture X6 of the device 10 with the ID: 6 to the device 10 with the ID: 1 in association with the timestamp "T<2 sec". Note that, the timestamp "T<2 sec" is associated because the device 10 with the ID: 5 has observed the device 10 with the ID: 6 until a second before the current time.

Note that, the locations/postures X0, X3, X5, and X6 in the observation table of the device 10 with the ID: 1 are not absolute locations/postures in the Earth's coordinate system, but relative locations/postures to the device 10 with the ID: 1.

With reference to FIG. 9, the device 10 with the ID: 2 directly observes the devices 10 with IDs: 0 and 3 at the current time. Therefore, as illustrated in FIG. 12, the observation table of the device 10 with the ID: 2 stores relative locations/postures X0 and X3 of the devices 10 with the IDs: 0 and 3 to the device 10 with the ID: 2 in association with the timestamp "now".

In addition, as illustrated in FIG. 6 to FIG. 9, although the device 10 with the ID: 2 has observed the device 10 with the ID: 7 until a second before the current time, the device 10 with the ID: 2 does not observe the device 10 with the ID: 7 at the current time. Accordingly, the device 10 with the ID: 2 predicts a location/posture of the device 10 with the ID: 7 at the current time on the basis of the past information. Therefore, as illustrated in FIG. 12, the observation table of the device 10 with the ID: 2 stores a relative location/posture X7 of the device 10 with the ID: 7 to the device 10 with the ID: 2 (a value predicted by the device 10 with the ID: 2) in association with the timestamp "T<2 sec".

Note that, the locations/postures X0, X3, and X7 in the observation table of the device 10 with the ID: 2 are not absolute locations/postures in the Earth's coordinate system, but relative locations/postures to the device 10 with the ID: 2.

Returning to FIG. 3, after all the requested observation tables are acquired (YES in Step 112), the control unit 1 then determines whether the number of acquired observation tables is two or more (Step 113). In the case where the number of acquired observation tables is two or more (YES in Step 113) (in other words, there is a plurality of directly observed devices 10), the control unit 1 selects one of the plurality of observation tables (Step 114), and then proceeds to next Step 115.

In the case where the number of acquired observation tables is one (NO in Step 113) (in other words, there is only one directly observed devices 10), the control unit 1 does not make a selection (because there is only one acquired observation table), and then proceeds to next Step 115.

[5. Respective Processes Performed on Acquired Locations/Postures]

With reference to FIG. 4, the control unit 1 reads one of the locations/postures from the acquired observation table in Step 115. Next, the control unit 1 determines whether the location/posture is a location/posture of another device 10 that is different from the own device 10 on the basis of information on the ID associated with the location/posture (Step 116).

In the case where the location/posture is a location/posture of the own device 10 (NO in Step 116), the control unit 1 proceeds to Step 124 without performing an additional process or an integration process, which will be described later. On the other hand, in the case where the location/posture is the location/posture of the other device 10 that is different from the won device 10 (YES in Step 116), the control unit 1 proceeds to next Step 117.

[5-1. Elimination of Old Location/Posture Information]

In Step 117, the control unit 1 calculates a difference T between the current time and a time indicated by a timestamp corresponding to the location/posture, and determines whether the difference T is less than the threshold Th (two seconds). In the case where the difference T is the threshold or more (NO in Step 117), the control unit 1 proceeds to Step 124.

In other words, the control unit 1 determines whether the corresponding location/posture is information older than the predetermined threshold Th (two seconds) on the basis of the timestamp associated with the location/posture acquired from the directly observed device 10. Next, in the case where the location/posture is old information, the control unit 1 eliminates the location/posture and does not reflect the location/posture in the own observation table.

In Step 117, the control unit 1 proceeds to next Step 118 in the case where the difference T between the current time and the time indicated by the timestamp corresponding to the location/posture is less than the threshold Th (two seconds), that is, in the case where the location/posture is new information.

[5-2. Conversion into Location/Posture Relative to Target Device 10]

In Step 118, the control unit 1 calculates a relative location/posture of an indirectly observed device 10 to the target device 10 on the basis of a relative (estimated) location/posture of a directly observed device 10 to the target device 10 and a relative (acquired) location/posture of the indirectly observed device 10 to the directly observed device 10.

In other words, a location/posture in an observation table acquired from the directly observed device 10 (location/posture serving as a current target of various kinds of determinations) is a relative location/posture to the directly observed device 10. Therefore, the control unit 1 cannot use the location/posture as it is. Accordingly, the control unit 1 converts the relative location/posture to the directly observed device 10 into a relative location/posture to the target device 10.

[5-3. Determination of Whether it is Overlapped Information]

After the conversion of the location/posture, the control unit 1 compares an ID corresponding to the location/posture with all the IDs included in the own observation table. Next, the control unit 1 determines whether the location/posture overlaps a location/posture corresponding to a same device 10 as a device 10 that has already been included in the own observation table (step 119).

Note that, in Step 119, the control unit 1 determines whether the two or more locations/postures overlap each other as locations/postures corresponding to the same device 10 (whether the locations/postures are overlapped information).

Here, there are three patterns where two or more locations/postures overlap each other as locations/postures corresponding to a same device 10.

First pattern: Information on a location/posture corresponding to a same device 10 as a device 10 whose location/posture has been estimated or predicted by the target device 10 is acquired from the directly observed device 10.

(1) A pattern where information on a location/posture corresponding to a same device 10 as a device 10 whose location/posture has been estimated or predicted by the target device 10, that is, the same device 10 as a directly observed device 10 is acquired from another directly observed device 10.

Example: A case where a target device (A) observes a device (b) and a device (C) and the device (B) observes the device (C).

(2) A pattern where information on a location/posture corresponding to a same device 10 as a device 10 whose location/posture has been predicted by the target device 10, that is, the same device 10 as a previously observed device 10 is acquired from a directly observed device 10.

Example: A case where the target device (A) does not observe the device (C) (the target device (A) has observed the device (C) in the past) but the device (B) observes the device (C) and the device (A) observes the device (B).

Second pattern: Pieces of information on locations/postures corresponding to a same device 10 are respectively acquired from two or more directly observed devices 10 that are different from each other.

Example: A case where the target device (A) observes the device (b) and the device (C), and the device (B) and the device (C) observe a device (D).

Third pattern: Combination of the first pattern and the second pattern. In other words, pieces of information on locations/postures corresponding to a same device 10 as a device 10 whose location/posture has been estimated or predicted by the target device 10 are respectively acquired from two or more directly observed devices 10.

Example: A case where the target device (A) observes the device (B), the device (C), and the device (D), and the device (B) and the device (C) observe the device (D).

[5-4. Integration of Overlapped Information]

In the case where the locations/postures overlap each other as locations/postures corresponding to the same device 10 in Step 119 (YES in Step 119), the control unit 1 performs a process of integrating the locations/postures that overlap each other as the locations/postures corresponding to the same device 10, into a single location/posture. This integration uses optimization of the locations/postures, pose graph optimization, weighted averages, or the like, for example. This makes it possible to improve accuracy of the location/posture after the integration process.

When integrating two or more locations/postures corresponding to the same device 10 into a single location/posture, the control unit 1 may determine which of the two or more locations/postures to be integrated will be preferentially reflected in the integrated location/posture.

In this case, for example, the control unit 1 refers to timestamps corresponding to the respective locations/postures. In addition, the control unit 1 performs the integration process by using weights in such a manner that a location/posture corresponding to a new timestamp will be preferentially reflected in the location/posture obtained after the integration process rather than a location/posture corresponding to an old timestamp.

In other words, there is a high possibility that the location/posture corresponding to the new timestamp is more accurate than the location/posture corresponding to the old timestamp. Therefore, accuracy of the location/posture obtained after the integration process is improved by preferentially reflecting the location/posture corresponding to the new timestamp in the location/posture obtained after the integration process.

In addition, for example, it is assumed that the respective devices 10 has different frame rates with regard to their imaging units 4 or has different processing speeds with regard to their control units 1, and therefore degrees of accuracy of estimation or prediction of a location/posture are different between the respective devices 10 (although in the present embodiment, all the devices 10 have a same degree of accuracy). In this case, for example, an observation table acquired through communication includes information indicating performance (frame rate or processing speed) of the device 10 that has obtained the location/posture.

In this case, the integration process may be performed by using weights in such a manner that a location/posture obtained by a device 10 with high performance is preferentially reflected in a location/posture obtained after the integration process rather than a location/posture obtained by a device 10 with low performance.

In other words, there is a high possibility that the location/posture obtained by the device 10 with high performance is more accurate than the location/posture obtained by the device 10 with low performance. Therefore, accuracy of the location/posture obtained after the integration process is improved by preferentially reflecting the location/posture obtained by the device 10 with high performance, which is likely to have high accuracy, in the location/posture obtained after the integration process.

Note that, instead of the above-described method, it is also possible to determine which of locations/postures will be preferentially reflected in the integrated location/posture, on the basis of information indicating reliability such as covariance.

Typically, (in view of observation time, performance of each device 10, covariance, or the like,) the control unit 1 integrates locations/postures by using weights in such a manner that, among a plurality of locations/postures that overlap each other, a location/posture with relatively high accuracy will be preferentially reflected in a location/posture obtained after the integration process rather than a location/posture with relatively low accuracy.

After the integration, the control unit 1 then compares the timestamps corresponding to the respective locations/postures that overlap each other (Step 121). Next, as a result of the comparison, the control unit 1 determines a new timestamp and updates the timestamp to a time indicated by the new timestamp in the own observation table (Step 122).

This makes it possible to store the integrated location/posture in association with the new timestamp among the timestamps corresponding to the two or more locations/postures that are integrated with each other. Note that, the control unit 1 does not update the timestamp in the case where the timestamps indicate a same time. Next, the control unit 1 proceeds to next Step 124.

[5-5. Addition of Non-Overlapped Information]

In the case where the locations/postures do not overlap each other as locations/postures corresponding to the same device 10 in Step 119 (NO in Step 119), the control unit 1 adds the location/posture to the own observation table.

In other words, in the case where information on a location/posture corresponding to a device 10 that is not the device 10 whose location/posture has been estimated or predicted by the target device 10 are acquired from a directly observed device 10, the control unit 1 adds the corresponding location/posture (obtained after the conversion) to the own observation table as a location/posture corresponding to a new device 10 and stores the observation table. Note that, at this time, the control unit 1 stores a timestamp and ID corresponding to the added location/posture in the own observation table in association with the added location/posture. After adding the location/posture, the control unit 1 proceeds to next Step 124.

[5-6. Determination of Whether there is Unprocessed Location/Posture]

In Step 124, the control unit 1 determines whether an unprocessed location/posture remains in the acquired observation table. In the case where the unprocessed location/posture remains (YES in Step 124), the control unit 1 returns to Step 115, reads one of locations/postures from the acquired observation table, and performs the processes in Step 116 and subsequent steps as described above.

In the case where no unprocessed location/posture remains (NO in Step 124), the control unit 1 determines whether an unprocessed observation table remains among all the acquired observation tables (Step 125). In the case where the unprocessed location/posture remains (YES in Step 125), the control unit 1 returns to Step 114, selects one of the acquired observation tables, and performs the processes in Step 115 and subsequent steps.

[5-7. Specific Examples of Respective Processes Performed on Acquired Location/Posture]

Here, details of the processes in Step 113 to Step 125 will be described with reference to an example.

First, as illustrated in FIG. 9, the device 10 with the ID: 0 directly observes the device 10 with the ID: 1 and the device 10 with the ID: 2 at the current time. In this case, as illustrated in FIG. 12, the control unit 1 of the device 10 with the ID: 0 acquires an observation table from the device 10 with the ID: 1 and acquires an observation table from the device 10 with the ID: 2.

In this case, the control unit 1 of the device 10 with the ID: 0 determines that the plurality of observation devices are acquired (YES in Step 113), and selects one of all the acquired observation table (Step 114). At this time, it is assumed that the observation table of the device 10 with the ID: 1 is selected.

Next, the control unit 1 of the device 10 with the ID: 0 reads one of locations/postures from the observation table of the selected device 10 with the ID: 1 (Step 115). As illustrated in FIG. 12, the observation table of the device 10 with the ID: 1 includes the locations/postures X0, X3, X5, and X6. One of the four locations/postures X0, X3, X5, and X6 is selected and read.

It is assumed that the location/posture X0 is read from the observation table of the device 10 with the ID: 1. Note that, the location/posture X0 is a relative location/posture of the device 10 with the ID: 0 to the device 10 with the ID: 1. The relative location/posture is estimated by the device 10 with the ID: 1 by observing the device 10 with the ID: 0 at the current time.

After the location/posture X0 is read, the control unit 1 of the device 10 with the ID: 0 then determines whether the location/posture X0 is a location/posture of another device 10 that is different from the own device 10, with reference to the ID corresponding to the location/posture X0 (Step 116).

Here, the ID corresponding to the location/posture XC is "C". Therefore, the location/posture XC is a location/posture of the own device 10 (NO in Step 116). Accordingly, the control unit 1 of the device 10 with the ID: 0 proceeds to Step 124 without performing the processes in Step 117 and the subsequent steps. In other words, the location/posture "XC" representing the own location/posture is not reflected in the own observation table.

Note that, the location/posture "X0" representing the own location/posture may be reflected in the own observation table. In other words, the relative location/posture X0 of the device 10 with the ID: 0 to the device 10 with the ID: 1 in the acquired observation table with the ID: 1 correlates with the relative location/posture X1(estimated) of the device 10 with the ID: 1 to the device 10 with the ID: 0 in the observation table of the own device 10 with the ID: 0.

Therefore, the relative location/posture X1(estimated) of the device 10 with the ID: 1 to the device 10 with the ID: 0 in the own observation table may be corrected by using the relative location/posture X0 of the device 10 with the ID: 0 to the device 10 with the ID: 1 (for example, through a method such as weighting based on performance or the like).

In Step 124, the control unit 1 of the device 10 with the ID: 0 determines whether an unprocessed location/posture remains in the observation table of the device 10 with the ID: 1. In this example, the locations/postures X3, X5, and X6 remain unprocessed, the control unit 1 of the device 10 with the ID: 0 returns to Step 115 and reads one of the locations/postures from the observation table of the device 10 with the ID: 1.

It is assumed that the location/posture X3 is read from the observation table of the device 10 with the ID: 1. Note that, the location/posture X3 is a relative location/posture of the device 10 with the ID: 3 to the device 10 with the ID: 1. The relative location/posture is estimated by the device 10 with the ID: 1 by observing the device 10 with the ID: 3 at the current time.

After the location/posture X3 is read, the control unit 1 of the device 10 with the ID: 0 then determines whether the location/posture X0 is a location/posture of another device 10 that is different from the own device 10, with reference to the ID corresponding to the location/posture X3 (Step 116).

Here, the ID corresponding to the location/posture X3 is "3". Therefore, the location/posture X3 is a location/posture of the other device 10 that is different from the own device 10 (YES in Step 116). In this case, the control unit 1 of the device 10 with the ID: 0 calculates a difference T between the current time and a time indicated by a timestamp corresponding to the location/posture X3, and determines whether the difference T is less than the threshold Th (two seconds) (Step 117).

The time indicated by the timestamp corresponding to the location/posture X3 is the current time ("now"). Therefore, the difference T is 0, and it is determined that the difference T is less than the threshold Th (two seconds) in this case (YES in Step 117).

Here, the location/posture X3 in the observation table of the device 10 with the ID: 1 is the relative location/posture of the device 10 with the ID: 3 to the device 10 with the ID: 1. Accordingly, the control unit 1 of the device 10 with the ID: 0 cannot use the information on the location/posture X3 as it is.

Therefore, in Step 118, the control unit 1 of the device 10 with the ID: 0 calculates a relative location/posture X3(from ID: 1) of the device 10 with the ID: 3 to the device 10 with the ID: 0 on the basis of the relative location/posture X1(estimated) of the device 10 with the ID: 1 (directly observed device 10) to the device 10 with the ID: 0 (target device 10) and the relative location/posture X3 of the device 10 with the ID: 3 (indirectly observed device 10) to the device 10 with the ID: 1.

Next, the control unit 1 of the device 10 with the ID: 0 compares the ID: 3 corresponding to the location/posture X3(from ID: 1) with all the IDs (1, 2, 3, 4, 6, and 7) in the own observation table (with the ID: 0). Next, the control unit 1 determines whether the location/posture X3(from ID: 1) overlaps as a location/posture corresponding to a same device 10 as a device 10 that has already been included in the own observation table (step 119).

The location/posture X3(from ID: 1) overlaps the location/posture X3(predicted) corresponding to the device 10 with the ID: 3, which has already been included in the own observation table (YES in Step 119). In this case, the control unit 1 of the device 10 with the ID: 0 performs a process of integrating the location/posture X3(from ID: 1) and the location/posture X3(predicted), which overlap each other as the locations/postures corresponding to the same device 10 with the ID: 3, into a single location/posture (Step 120).

Note that, here, the value obtained by integrating the location/posture X3(predicted) and the location/posture X3(from ID: 1) is described as "X3(predicted)+X3(from ID: 1)".

With regard to the integration, the control unit 1 of the device 10 with the ID: 0 refers to the timestamp "last frame" corresponding to the location/posture X3(predicted) and the timestamp "now" corresponding to the location/posture X3(from ID: 1), for example.

In this case, the control unit 1 of the device 10 with the ID: 0 integrates the locations/postures by using weights in such a manner that the location/posture X3(from ID1) corresponding to the new timestamp "now" will be preferentially reflected in the location/posture X3(predicted)+X3(from ID1) obtained after the integration process rather than the location/posture X3(predicted) corresponding to the old timestamp "last frame".

Note that, the example of integrating the location/posture X3(predicted) with the location/posture X3(from ID: 1) is an example in which the locations/postures are integrated in the case where the locations/postures overlap each other according to the first pattern (2) as described above.

After the integration, the control unit 1 then compares the timestamp "last frame" corresponding to the overlapping location/posture X3(predicted) with the timestamp "now" corresponding to the overlapping location/posture X3(from ID: 1) (Step 121).

Next, by the comparison, the control unit 1 of the device 10 with the ID: 0 selects the new timestamp "now" from among the timestamps "last frame" and "now". Next, the control unit 1 of the device 10 with the ID: 0 updates the timestamp to a time indicated by the new timestamp "now" in the own observation table with the ID: 0 (Step 122).

Next, the control unit 1 of the device 10 with the ID: 0 determines whether an unprocessed location/posture remains in the acquired observation table with the ID: 1 (Step 124). In this example, the locations/postures X5 and X6 remain unprocessed. Therefore, the control unit 1 of the device 10 with the ID: 0 returns to Step 115 and reads one of the locations/postures from the observation table of the device 10 with the ID: 1.

It is assumed that the location/posture X5 is read from the observation table of the device 10 with the ID: 1. Note that, the location/posture X5 is a relative location/posture of the device 10 with the ID: 5 to the device 10 with the ID: 1. The relative location/posture is estimated by the device 10 with the ID: 1 by observing the device 10 with the ID: 5 at the current time.

After the location/posture X5 is read, the control unit 1 of the device 10 with the ID: 0 then determines whether the location/posture X0 is a location/posture of another device 10 that is different from the own device 10, with reference to the ID corresponding to the location/posture X5 (Step 116).

Here, the ID corresponding to the location/posture X5 is "5". Therefore, the location/posture X5 is a location/posture of the other device 10 that is different from the own device 10 (YES in Step 116). In this case, the control unit 1 of the device 10 with the ID: 0 calculates a difference (T) between the current time and a time indicated by a timestamp corresponding to the location/posture X5, and determines whether the difference T is less than the threshold Th (two seconds) (Step 117)

The time indicated by the timestamp corresponding to the location/posture X5 is the current time ("now"). Therefore, the difference T is 0, and it is determined that the difference T is less than the threshold Th (two seconds) in this case (YES in Step 117).

Next, in Step 118, the control unit 1 of the device 10 with the ID: 0 calculates a relative location/posture X5(from ID: 1) of the device 10 with the ID: 5 to the device 10 with the ID: 0 on the basis of the relative location/posture X1(estimated) of the device 10 with the ID: 1 (directly observed device 10) to the device 10 with the ID: 0 (target device 10) and the relative location/posture X5 of the device 10 with the ID: 5 (indirectly observed device) to the device 10 with the ID: 1.

Next, the control unit 1 of the device 10 with the ID: 0 compares the ID: 5 corresponding to the location/posture X5(from ID: 1) with all the IDs (1, 2, 3, 4, 6, and 7) in the own observation table (with the ID: 0). Next, the control unit 1 determines whether the location/posture X5(from ID: 1) overlaps as a location/posture corresponding to a same device 10 as the device 10 that has already been included in the own observation table (step 119).

The location/posture X5(from ID: 1) does not overlap the locations/postures corresponding to the respective devices 10 that have already included in the own observation table (NO in Step 119). In this case, the control unit 1 of the device 10 with the ID: 0 performs a process of adding the location/posture X5(from ID: 1) to the own observation table (Step 123). At this time, the control unit 1 of the device 10 with the ID: 0 also adds the ID: 5 and the timestamp "now" that correspond to the location/posture X5 into the own observation table.

Next, the control unit 1 of the device 10 with the ID: 0 determines whether an unprocessed location/posture remains in the observation table with the ID: 1 (Step 124). In this example, the location/posture X6 remains unprocessed. Therefore, the control unit 1 of the device 10 with the ID: 0 returns to Step 115 and reads the locations/posture X6 from the observation table acquired from the device 10 with the ID: 1.

Note that, the location/posture X6 is a value obtained when the device 10 with the ID: 5 predicts a location/posture of the device 10 with the ID: 6 relative to the device 10 with the ID: 5 (previously observed device 10 for indirectly observed devices 10), the device 10 with the ID: 1 acquires the location/posture, and the device 10 with the ID: 1 converts the location/posture into a relative location/posture of the device 10 with the ID: 6 to the device 10 with the ID: 1.

After the location/posture X6 is read, the control unit 1 of the device 10 with the ID: 0 then determines whether the location/posture X0 is a location/posture of another device 10 that is different from the own device 10, with reference to the ID corresponding to the location/posture X6 (Step 116).

Here, the ID corresponding to the location/posture X6 is "6". Therefore, the location/posture X6 is a location/posture of the other device 10 that is different from the own device 10 (YES in Step 116). In this case, the control unit 1 of the device 10 with the ID: 0 calculates a difference (T) between the current time and a time indicated by a timestamp corresponding to the location/posture X6, and determines whether the difference T is less than the threshold Th (two seconds) (Step 117).

The timestamp corresponding to the location/posture X3 is "T<2 sec". Therefore, it is determined that the difference T is less than the threshold Th (two seconds) in this case (YES in Step 117).

Next, in Step 118, the control unit 1 of the device 10 with the ID: 0 calculates a relative location/posture X6(from ID: 1) of the device 10 with the ID: 6 to the device 10 with the ID: 0 on the basis of the relative location/posture X1(estimated) of the device 10 with the ID: 1 (directly observed device 10) to the device 10 with the ID: 0 (target device 10) and the relative location/posture X6 of the device 10 with the ID: 6 to the device 10 with the ID: 1 (previously observed device 10 for indirectly observed device 10).

Next, the control unit 1 of the device 10 with the ID: 0 compares the ID: 6 corresponding to the location/posture X6(from ID: 1) with all the IDs (1, 2, 3, 4, 5(added), 6, and 7) in the own observation table (with the ID: 0). Next, the control unit 1 determines whether the location/posture X6(from ID: 1) overlaps as a location/posture corresponding to a same device 10 as the device 10 that has already been included in the own observation table (step 119).

The location/posture X6(from ID: 1) overlaps the location/posture X6(predicted) corresponding to the device 10 with the ID: 6, which has already been included in the own observation table (YES in Step 119). In this case, the control unit 1 of the device 10 with the ID: 0 performs a process of integrating the location/posture X6(from ID: 1) and the location/posture X6(predicted), which overlap each other as locations/postures corresponding to the same device 10 with the ID: 6, into a single location/posture (Step 120).

In the integration, the control unit 1 of the device 10 with the ID: 0 refers to the timestamp "T≥2 ec" corresponding to the location/posture X6(predicted) and the timestamp "T<2 ec" corresponding to the location/posture X6(from ID: 1), for example.

In this case, the control unit 1 of the device 10 with the ID: 0 integrates the locations/postures by using weights in such a manner that the location/posture X6(from ID: 1) corresponding to the new timestamp "T<2 ec" will be preferentially reflected in the location/posture X3 obtained after the integration process rather than the location/posture X6(predicted) corresponding to the old timestamp "T≥2 ec".

Note that, the example of integrating the location/posture X6(predicted) with the location/posture X6(from ID: 1) is an example in which the locations/postures are integrated in the case where the locations/postures overlap each other according to the first pattern (2) as described above.

After performing the integration process, the control unit 1 then compares the timestamp "T≥2 ec" corresponding to the overlapping location/posture X6(predicted) with the timestamp "T<2 ec" corresponding to the overlapping location/posture X6(from ID: 1) (Step 121).

Next, by the comparison, the control unit 1 of the device 10 with the ID: 0 selects the new timestamp "T<2 ec" from among the two timestamps "T≥2 ec" and "T<2 ec". Next, the control unit 1 of the device 10 with the ID: 0 updates the timestamp to a time indicated by the new timestamp "T<2 ec" in the own observation table with the ID: 0 (Step 122).

Next, the control unit 1 of the device 10 with the ID: 0 determines whether an unprocessed location/posture remains in the acquired observation table with the ID: 1 (Step 124). In this example, no unprocessed location/posture remains. Therefore, the control unit 1 of the device 10 with the ID: 0 proceeds to next Step 125 and determines whether an unprocessed observation table remains among the acquired observation tables.

In this example, the observation table acquired from the devices 10 with the ID: 2 remains as the unprocessed observation table (YES in Step 125). Therefore, the control unit 1 of the device 10 with the ID: 0 returns to Step 114, selects the observation table acquired from the device 10 with the ID: 2, and then reads one of the locations/postures from the observation table of the device 10 with the ID: 2 in Step 115.

As illustrated in FIG. 12, the observation table acquired from the device 10 with the ID: 2 includes locations/postures X0, X3, and X7.

It is assumed that the location/posture X0 is read from the observation table of the device 10 with the ID: 1. Note that, the location/posture X0 is a relative location/posture of the device 10 with the ID: 0 to the device 10 with the ID: 2. The relative location/posture is estimated by the device 10 with the ID: 2 by observing the device 10 with the ID: 0 at the current time.

After the location/posture X0 is read, the control unit 1 of the device 10 with the ID: 0 then determines whether the location/posture XC is a location/posture of another device 10 that is different from the own device 10, with reference to the ID corresponding to the location/posture XC (Step 116).

Here, the ID corresponding to the location/posture X0 is "0". Therefore, the location/posture X0 is a location/posture of the own device 10 (NO in Step 116). Accordingly, the control unit 1 of the device 10 with the ID: 0 proceeds to Step 124 without performing the processes in Step 117 and the subsequent steps. In other words, the location/posture "X0" representing the self location/posture is not reflected in the own observation table. Note that, the location/posture "X0" representing the self location/posture may be reflected in the own observation table.

In Step 124, the control unit 1 of the device 10 with the ID: 0 determines whether an unprocessed location/posture remains in the acquired observation table of the device 10 with the ID: 2. In this example, the locations/postures X3 and X7 remain unprocessed. Therefore, the control unit 1 of the device 10 with the ID: 0 returns to Step 115 and reads one of the locations/postures from the observation table of the device 10 with the ID: 2.

It is assumed that the location/posture X3 is read. Note that, the location/posture X3 is a relative location/posture of the device 10 with the ID: 3 to the device 10 with the ID: 2. The relative location/posture is estimated by the device 10 with the ID: 2 by observing the device 10 with the ID: 3 at the current time.

After the location/posture X3 is read, the control unit 1 of the device 10 with the ID: 0 then determines whether the location/posture X3 is a location/posture of another device 10 that is different from the own device 10, with reference to the ID corresponding to the location/posture X3 (Step 116).

Here, the ID corresponding to the location/posture X3 is "3". Therefore, the location/posture X3 is a location/posture of the other device 10 that is different from the own device 10 (YES in Step 116). In this case, the control unit 1 of the device 10 with the ID: 0 calculates a difference (T) between the current time and a time indicated by a timestamp corresponding to the location/posture X3, and determines whether the difference T is less than the threshold Th (two seconds) (Step 117).

The time indicated by the timestamp corresponding to the location/posture X3 is the current time ("now"). Therefore, the difference T is 0, and it is determined that the difference T is less than the threshold Th (two seconds) in this case (YES in Step 117).

Here, the location/posture X3 in the observation table of the device 10 with the ID: 2 is the relative location/posture of the device 10 with the ID: 3 to the device 10 with the ID: 2. Accordingly, the control unit 1 of the device 10 with the ID: 0 cannot use the information on the location/posture X3 as it is.

Therefore, in Step 118, the control unit 1 of the device 10 with the ID: 0 calculates a relative location/posture X3(from ID: 2) of the device 10 with the ID: 3 to the device 10 with the ID: 0 on the basis of the relative location/posture X2(estimated) of the device 10 with the ID: 2 (directly observed device 10) to the device 10 with the ID: 0 (target device 10) and the relative location/posture X3 of the device 10 with the ID: 3 (indirectly observed device) to the device 10 with the ID: 2.

Next, the control unit 1 of the device 10 with the ID: 0 compares the ID: 3 corresponding to the location/posture X3(from ID: 2) with all the IDs (1, 2, 3, 4, 5(added), 6, and 7) in the own observation table (with the ID: 0). Next, the control unit 1 determines whether the location/posture X3(from ID: 2) overlaps as a location/posture corresponding to a same device 10 as a device 10 that has already been included in the own observation table (step 119).

The location/posture X3(from ID: 2) overlaps the location/posture X3(predicted)+X3(from ID: 1) corresponding to the device 10 with the ID: 3 (a value obtained by integrating X3(predicted) with X3(from ID: 1)), and the own observation table has already included the device 10 with the ID: 3 (YES in Step 119). In this case, the control unit 1 of the device 10 with the ID: 0 performs a process of integrating the location/posture X3(from ID: 2) and the location/posture X3(predicted)+X3(from ID: 1), which overlap each other as the locations/postures corresponding to the same device 10 with the ID: 3, into a single location/posture (Step 120).

In the integration, the control unit 1 of the device 10 with the ID: 0 refers to the timestamp "now" corresponding to the location/posture X3(predicted)+X3(from ID: 1) and the timestamp "now" corresponding to the location/posture X3(from ID: 2), for example.

In this case, both of the timestamps indicate "now". Therefore, the location/posture X3(predicted)+X3(from ID: 1) and the location/posture X3(from ID: 2) are even when determining whether the locations/postures are old or new. In this case, the locations/postures may be integrated by using weights in such a manner that the location/posture X3(predicted)+X3(from ID: 1) and the location/posture X3(from ID: 2) are equally reflected in a location/posture obtained after the integration process.

Note that, in this example, the locations/postures X3(predicted) and X3(from ID: 1) are integrated and then the integrated value X3(predicted)+X3(from ID: 1) is further integrated with the location/posture X3(from ID: 2).

Alternatively, the three locations/postures X3(predicted), X3(from ID: 1), and the X3(from ID: 2) may be integrated after all the three locations/postures are collected as overlapping information.

Note that, the example of integrating the locations/postures X3(predicted), X3(from ID: 1), and the X3(from ID: 2) is an example in which the locations/postures are integrated in the case where the locations/postures overlap each other according to the third pattern described above.

After the integration process is performed, the control unit 1 then compares the timestamp "now" corresponding to the location/posture X3(predicted)+X3(from ID: 1) with the timestamp "now" corresponding to the location/posture X3(from ID: 2) (Step 121).

Next, by the comparison, the control unit 1 of the device 10 with the ID: 0 determines which of the two timestamps "now" and "now" is new. In this case, the control unit 1 of the device 10 with the ID: 0 determines that the timestamps are the same, and does not update the timestamp in this case.

Next, the control unit 1 of the device 10 with the ID: 0 determines whether an unprocessed location/posture remains in the observation table with the ID: 2 (Step 124). In this example, the location/posture X7 remains unprocessed. Therefore, the control unit 1 of the device 10 with the ID: 0 returns to Step 115 and reads the locations/posture X7 from the observation table acquired from the device 10 with the ID: 2.

Note that, the location/posture X7 is a location/posture of the device 10 with the ID: 6 relative to the device 10 with the ID: 2 (previously observed device 10 (second previously observed device 10) for indirectly observed devices 10). The location/posture has been predicted by the device 10 with the ID: 2.

After the location/posture X7 is read, the control unit 1 of the device 10 with the ID: 0 then determines whether the location/posture X0 is a location/posture of another device 10 that is different from the own device 10, with reference to the ID corresponding to the location/posture X7 (Step 116).

Here, the ID corresponding to the location/posture X7 is "7". Therefore, the location/posture X7 is a location/posture of the other device 10 that is different from the own device 10 (YES in Step 116). In this case, the control unit 1 of the device 10 with the ID: 0 calculates a difference (T) between the current time and a time indicated by a timestamp corresponding to the location/posture X7, and determines whether the difference T is less than the threshold Th (two seconds) (Step 117).

The timestamp corresponding to the location/posture X7 is "T<2 sec". Therefore, it is determined that the difference T is less than the threshold Th (two seconds) in this case (YES in Step 117).

Next, in Step 118, the control unit 1 of the device 10 with the ID: 0 calculates a relative location/posture X7(from ID: 2) of the device 10 with the ID: 7 to the device 10 with the ID: 0 on the basis of the relative location/posture X2(estimated) of the device 10 with the ID: 2 (directly observed device 10) to the device 10 with the ID: 0 (target device 10) and the relative location/posture X7 of the device 10 with the ID: 7 to the device 10 with the ID: 2 (previously observed device 10 (second previously observed device 10) for the directly observed device 10).

Next, the control unit 1 of the device 10 with the ID: 0 compares the ID: 7 corresponding to the location/posture X7(from ID: 2) with all the IDs (1, 2, 3, 4, 5(added), 6, and 7) in the own observation table (with the ID: 0). Next, the control unit 1 determines whether the location/posture X7 (from ID: 2) overlaps as a location/posture corresponding to a same device 10 as a device 10 that has already been included in the own observation table (step 119).

The location/posture X7 (from ID: 2) overlaps the location/posture X7(predicted) corresponding to the device 10 with the ID: 7, which has already been included in the own observation table (YES in Step 119). In this case, the control unit 1 of the device 10 with the ID: 0 performs a process of integrating the location/posture X7(from ID: 2) and the location/posture X7(predicted), which overlap each other as the locations/postures corresponding to the same device 10 with the ID: 7, into a single location/posture (Step 120).

In the integration, the control unit 1 of the device 10 with the ID: 0 refers to the timestamp "T<2 ec" corresponding to the location/posture X7(predicted) and the timestamp "T<2 ec" corresponding to the location/posture X7 (from ID: 2), for example.

In this case, both of the timestamps indicate a same time (because both of the two timestamps "T<2 ec" indicate the last time when the device 10 with the ID: 2 has observed the device 10 with the ID: 7. Therefore, the location/posture X7(predicted) and the location/posture X7(from ID: 2) are even when determining whether the locations/postures are old or new. In this case, the locations/postures may be integrated by using weights in such a manner that the location/posture X7(predicted) and the location/posture X7(from ID: 2) are equally reflected in a location/posture obtained after the integration process.

Note that, the example of integrating the location/posture X7(predicted) with the location/posture X7(from ID: 2) is an example in which the locations/postures are integrated in the case where the locations/postures overlap each other according to the first pattern (2) as described above.

After the integration process is performed, the control unit 1 then compares the timestamp "T<2 ec" corresponding to the location/posture X7(predicted) with the timestamp "T<2 ec" corresponding to the location/posture X7(from ID: 2) (Step 121).

Next, by the comparison, the control unit 1 of the device 10 with the ID: 0 determines which of the two timestamps "T<2 ec" and "T<2 ec" is new. In this case, the control unit 1 of the device 10 with the ID: 0 determines that the timestamps are the same, and does not update the timestamp in this case.

Next, the control unit 1 of the device 10 with the ID: 0 determines whether an unprocessed location/posture remains in the acquired observation table with the ID: 2 (Step 124). In this example, no unprocessed location/posture remains. Therefore, the control unit 1 of the device 10 with the ID: 0 proceeds to next Step 125 and determines whether an unprocessed observation table remains. In this example, no unprocessed observation table remains. Therefore, the control unit 1 proceeds to next Step 126.

In the above paragraphs, details of the example of the processes in Step 113 to Step 125 has been described with reference to FIG. 12. Next, returning to FIG. 5, a general description will be given.

[6. Deletion of Old Location/Posture]

In the case where no unprocessed observation table remains (NO in Step 125), the control unit 1 reads one of the timestamps from the current own observation table (Step 126). Next, the control unit 1 calculates a difference T between the current time and a time indicated by the timestamp, and determines whether the difference T is less than the threshold Th (two seconds) (Step 127).

In the case where the difference T is the threshold or more (NO in Step 127), the control unit 1 deletes the location/posture corresponding to the timestamp from the own observation table. In other words, the old location/posture whose difference T from the current time is the threshold or more is deleted because of low accuracy. Note that, when deleting the location/posture, the control unit 1 also deletes the corresponding ID and the corresponding timestamp from the own observation table.

After deleting the corresponding location/posture, ID, and timestamp, the control unit 1 proceeds to next Step 129.

In the case where the difference T is less than the threshold in Step 127 (YES in Step 127), the control unit 1 proceeds to next Step 129 without performing the process of deleting corresponding location/posture or the like.

In Step 129, the control unit 1 determines whether an unprocessed timestamp remains among the timestamps in the current own observation table. In the case where the unprocessed timestamp remains (YES in Step 129), the control unit 1 returns to Step 126 and reads one of the timestamps from the own observation table. Next, the control unit 1 performs the processes in Step 127 and subsequent steps on the read timestamp.

[6-1. Detailed Example of Deletion of Old Information]

With reference to FIG. 12, an example of processes in Step 126 to Step 129 will be described in detail.

The control unit 1 of the device 10 with the ID: 0 reads one of the timestamps from the current own observation table (with the ID: 0) (observation table obtained after communication). Note that, the current own observation table includes seven timestamps "now", "now", "now", "T≥2 sec", "now", "T<2 sec", and "T<2 sec".

Among the seven timestamps, differences T between the current time and times indicated by the four timestamps "now" and the two timestamps "<2 sec" are less than the threshold Th (two seconds) (YES in Step 127). Therefore, the control unit 1 of the device 10 with the ID: 0 does not perform the deletion process on locations/postures corresponding to these timestamps.

On the other hand, a difference T between the current time and a time indicated by the timestamp "T≥2 sec" is the threshold Th (two seconds) or more (NO in Step 127). In this case, the control unit 1 of the device 10 with the ID: 0 determines that the location/posture X4(predicted) corresponding to the timestamp is old information with low accuracy, and deletes the location/posture X4(predicted) form the own observation table (Step 128). At this time, the control unit 1 of the device 10 with the ID: 0 deletes the ID: 4 and the timestamp "T≥2 sec" corresponding to the location/posture X4(predicted) from the own observation table.

As described above, the integration process, the addition process, and the deletion process are performed on the own observation table, and a latest observation table (illustrated in the bottom of FIG. 12) is obtained. Locations/postures in the latest observation table are used for AR display or the like on the devices 10. Note that, it is also possible to use the latest observation table as an observation table for communication.

[7. Update of Observation Table for Communication]

Next, returning to FIG. 5, the general description will be given again. In the case where no unprocessed timestamp remains in Step 129 (YES in Step 129), the control unit 1 proceeds to next Step 130. In Step 130, the control unit 1 instructs the storage unit 2 to lock access from another device 10 to the observation table for communication.

Next, during the locked period, the control unit 1 overwrites the observation table for communication with a latest observation table, and updates the observation table for communication (Step 131). After the update of the observation table finishes, the control unit 1 releases the lock of the storage unit 2 (Step 132). Next, the control unit 1 returns to the initial Step 101, and performs the processes in Step 101 and the subsequent steps.

[8. Data Transmission Process]

Figure 13:
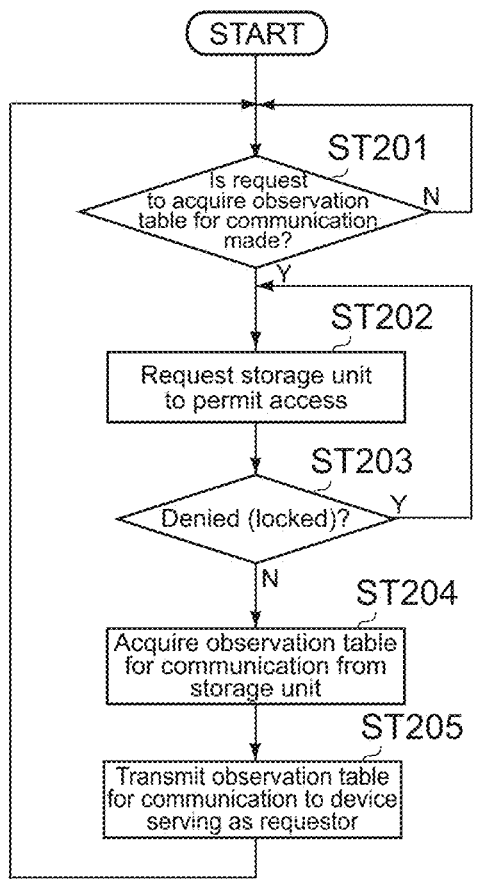
FIG. 13 is a diagram illustrating processes of transmitting an observation table for communication in response to a request from another device.

Next, processes performed by the control unit 1 when transmitting the observation table for communication in response to a request from another device 10 will be described. FIG. 13 is a diagram illustrating the processes of transmitting an observation table for communication in response to a request from another device 10.

Note that, the data transmission processes illustrated in FIG. 13 are performed simultaneously with various series of processes such as the self location estimation illustrated in FIG. 3 to FIG. 5 or the like.

First, the control unit 1 determines whether another device 10 has requested to acquire an observation table for communication (Step 201). In the case where the other device 10 has not requested to acquire the observation table (NO in Step 201), the control unit 1 again determines whether the other device 10 has requested to acquire the observation table for communication.

In the case where the other device 10 has requested to acquire the observation table for communication (YES in Step 201), the control unit 1 requests the storage unit 2 to permit access to acquire the observation table. Next, the control unit 1 determines whether the storage unit 2 is denying the access (Step 203). Note that, during the locked period, the storage unit 2 returns denial of the access to acquire the observation table for communication.

In the case where the access is denied (YES in Step 203), the control unit 1 returns to Step 202 and again requests the storage unit 2 to permit access to acquire the observation table. In the case where an access denial response is not made (access is permitted) (No in Step 203), the control unit 1 acquires the observation table for communication from the storage unit 2 (Step 204). Next, the control unit 1 transmits the observation table for communication to the device 10 serving as the requestor (Step 205).

[8-1. Detailed Example of Data Transmission Processes]

Figure 14:
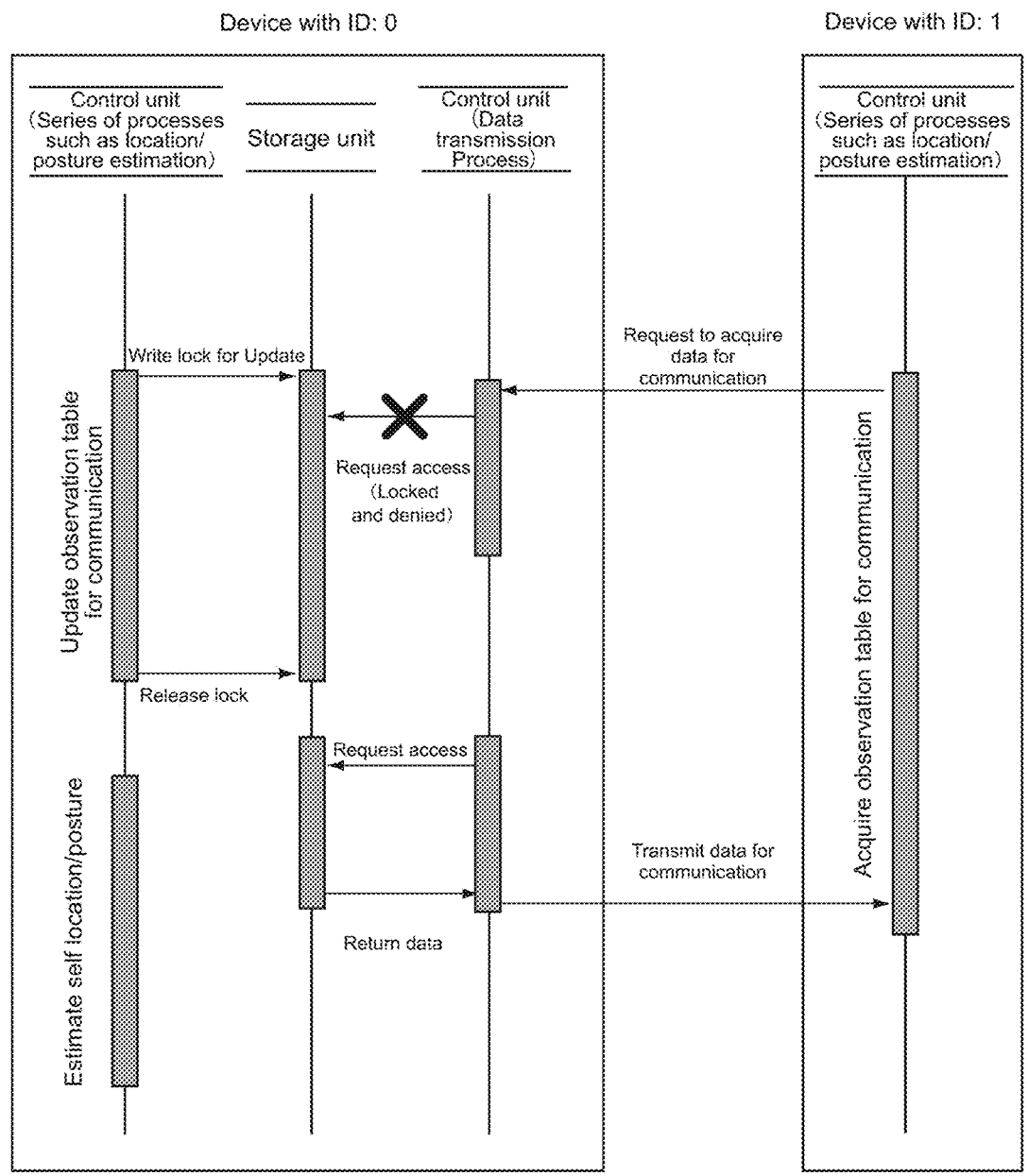
FIG. 14 is a diagram illustrating an example of the processes of transmitting the observation table for communication in response to the request from the other device.

An example of the processes of transmitting the observation table for communication in response to the request from the other device 10 will be described in detail. FIG. 14 is a diagram illustrating an example of the processes of transmitting the observation table for communication in response to the request from the other device 10.

Note that, FIG. 14 illustrates a situation where the device 10 with the ID: 0 transmits an observation table for communication to the device 10 with the ID: 1 in response to a request from the device 10 with the ID: 1.

With reference to FIG. 14, the control unit 1 of the device 10 with the ID: 0 performs the series of processes such as the self location estimation (hereinafter, simply referred to as the series of processes) illustrated in FIG. 3 to FIG. 5. In addition, in parallel to the series of processes, the control unit 1 of the device 10 with the ID: 0 performs the data transmission processes illustrated in FIG. 13.

In a similar way, the control unit 1 of the device 10 with the ID: 1 also performs the series of processes illustrated in FIG. 3 to FIG. 5. Note that, in parallel to the series of processes, the control unit 1 of the device 10 with the ID: 1 performs the data transmission processes illustrated in FIG. 13 although these processes are not illustrated in FIG. 14 for descriptive purposes.

In the series of processes, the control unit 1 of the device 10 with the ID: 0 instructs the storage unit 2 to lock the access to the observation table for communication to update the observation table for communication (see Step 130 in FIG. 5). Subsequently, during the locked period, the control unit 1 of the device 10 with the ID: 0 overwrites the observation table for communication with a latest observation table, and updates the observation table for communication (Step 131).

Next, the control unit 1 of the device 10 with the ID: 0 releases the lock (see Step 132 in FIG. 5), and estimates a location/posture of the own device 10 again (see Step 101 in FIG. 3).

Here, it is assumed that the device 10 with the ID: 0 observes the device 10 with the ID: 0. In this case, the control unit 1 of the device 10 with the ID: 1 requests the device 10 with the ID: 0 to acquire an observation table for communication in the series of processes (see Step 111 in FIG. 3).

In the case where the request to acquire the observation table for communication is made by the device 10 with the ID: 1 in the data transmission processes (YES in Step 201 in FIG. 13), the control unit 1 of the device 10 with the ID: 0 requests the storage unit 2 to permit access to acquire the observation table (see Step 202 in FIG. 13).

Next, the control unit 1 of the device 10 with the ID: 0 determines whether the storage unit 2 is denying the access (see Step 203 in FIG. 13).

FIG. 14 illustrates an example in which the access request to acquire the observation table is made in the locked period but the access is denied by the storage unit 2.

In the case where the access is denied (YES in Step 203 in FIG. 13), the control unit 1 of the device 10 with the ID: 0 again requests the storage unit 2 to permit access to acquire the observation table (see Step 202 in FIG. 13).

In the case where the access denial response is not made (access is permitted) (No in Step 203 in FIG. 13), the control unit 1 of the device 10 with the ID: 0 acquires the observation table for communication from the storage unit 2 (see Step 204 in FIG. 13). Next, the control unit 1 of the device 10 with the ID: 0 transmits the observation table for communication to the device 10 with the ID: 01 (see Step 205 in FIG. 13).

<Workings, etc.>

In the present embodiment, the target device 10 (control unit 1) first estimates locations/postures of directly observed devices (first devices) 10 detected from a captured image an image (for example, X1(estimated) and X2(estimated) in FIG. 12). Next, the first environment information that is environment information of the directly observed devices (first devices) 10 is acquired from the directly observed devices 10 (first devices) that have been detected. The target device 10 generates the second environment information that is the own environment information, on the basis of the estimated locations/postures of the directly observed devices (first devices) 10 and the acquired first environment information.

Therefore, according to the present technology, the series of "observations" made by the devices 10 forms a network with regard to relative locations/postures. This makes it possible to form the network with regard to relative locations/postures without using a central unit such as a server. Therefore, it is possible to prevent the whole system from malfunction due to malfunction of the server.

Figure 15:
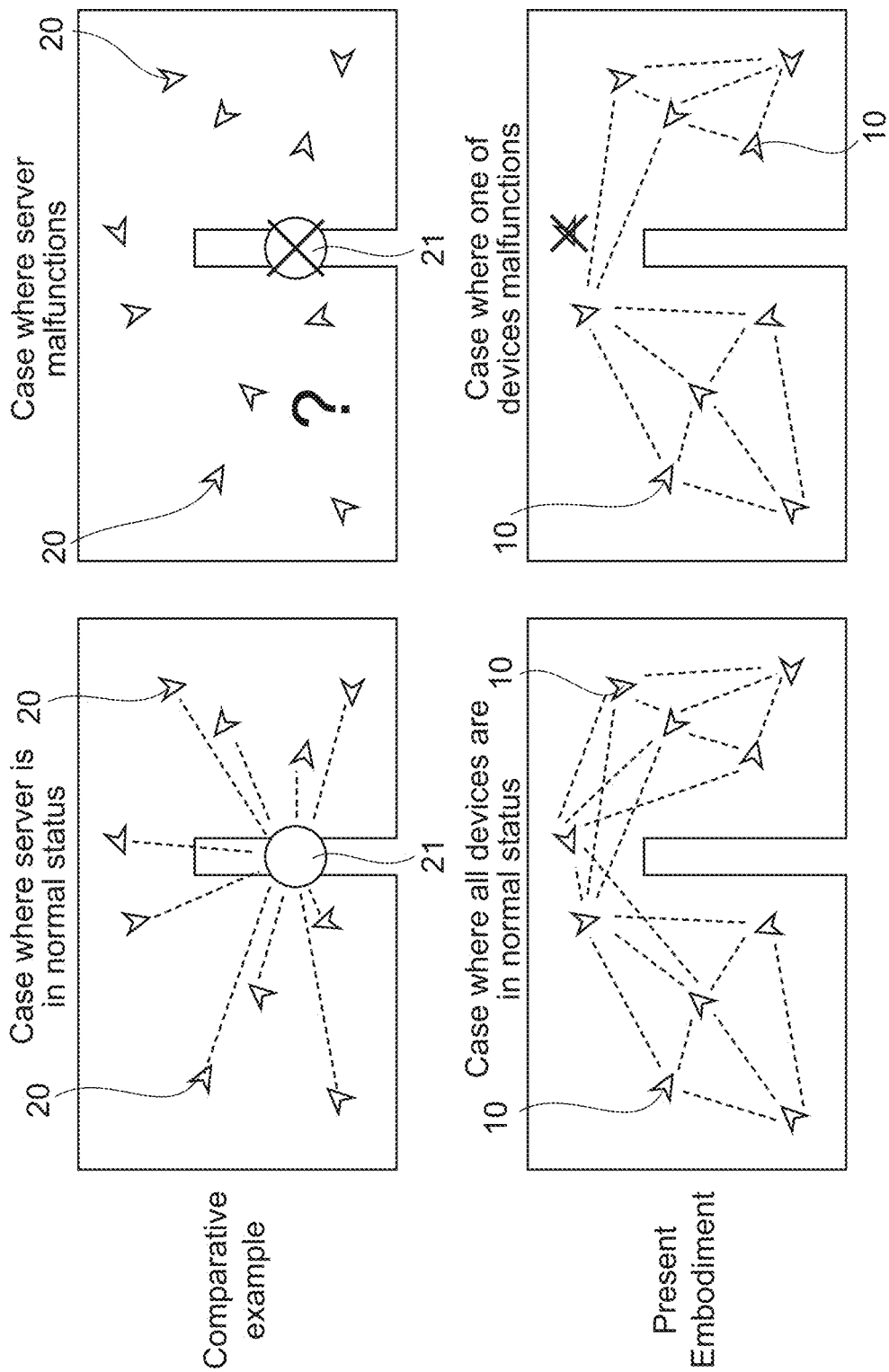
FIG. 15 is a comparative diagram for comparing the first embodiment with a comparative example.

FIG. 15 is a comparative diagram for comparing the present embodiment with a comparative example. An upper left diagram in FIG. 15 is a diagram illustrating a situation of a system according to the comparative example in the case where a server 21 is in a normal status. In addition, an upper right diagram in FIG. 15 is a diagram illustrating a situation of the system according to the comparative example in the case where the server 21 malfunctions.

In addition, a lower left diagram in FIG. 15 is a diagram illustrating a situation of the system according to the present embodiment in the case where all devices 10 are in a normal status. In addition, a lower right diagram in FIG. 15 is a diagram illustrating a situation of the system according to the present embodiment in the case where one of the devices 10 malfunctions.

The system according to the comparative example illustrated in the top of FIG. 15 includes the server 21 and a plurality of nodes 20 (such as head-mounted displays). In the comparative example, the respective nodes 20 estimates their self locations/postures (such as self locations/postures based on an absolute coordinate system using the GPS), and transmit the locations/postures to the server 21. The server 21 acquires and stores the locations/postures of the nodes 20. The respective nodes acquire locations/postures of other nodes 20 from the server 21, and thereby recognize the locations/postures of the other nodes 20.

In the comparative example, the locations/postures of the respective nodes 20 are shared via the server 21. Therefore, when the server 21 malfunctions as illustrated in the upper right diagram in FIG. 15, the respective nodes 20 cannot recognize the locations/postures of the other nodes 20, and this results in malfunction of the whole system.

On the other hand, as illustrated in the bottom of FIG. 15, in the system according to the present embodiment, locations/postures of the respective devices 10 are shared through a series of "observations", and this sharing does not rely on the server. Accordingly, a central unit such as the server is not necessary, and it is possible to prevent the whole system from malfunction due to malfunction of the server.

In addition, as illustrated in the lower right diagram in FIG. 15, even in the case where one of the devices 10 malfunctions, the network according to the present embodiment is formed variably. Therefore, the other normal devices 10 can form an appropriate network. This makes it possible to reduce the possibility of network disruption of the whole system.

In addition, according to the present embodiment, the series of "observations" forms the network with regard to relative locations/postures. Therefore, for example, it is also possible to recognize a location/posture of another device 10 (user) that is behind an obstacle such as a wall or out of a line of vision and cannot be directly observed. This also makes it possible to perform AR display or the like with regard to the other device 10 (user) that cannot be actually recognized.

For example, in FIG. 9, there is an obstacle 16 between the device 10 with the ID: 0 and the device 10 with the ID: 5, and the device 10 with the ID: 0 cannot directly observe the device 10 with the ID: 5. However, the device 10 with the ID: 0 can recognize the location/posture of the device 10 with the ID: 5 via the device 10 with the ID: 1. Therefore, it is possible for the device 10 with the ID: 0 to display a virtual object at the location of the device 10 with the ID: 5 in the AR manner, for example.

In addition, in FIG. 9, the device 10 with the ID: 0 cannot directly observe the device 10 with the ID: 3 that is out of its line of vision. However, the device 10 with the ID: 0 can recognize the location/posture of the device 10 with the ID: 3 via the device 10 with the ID: 1 and the device 10 with the ID: 2. Therefore, it is possible for the device 10 with the ID: 0 to notify the user of existence of the device 10 with the ID: 3 (another user) by displaying an object such as an arrow indicating the existence of the device 10 with the ID: 3 that is out of the line of vision of the device 10 with the ID: 0.

For example, it is assumed that first environment information of a directly observed device (first device) 10 includes a location/posture of an indirectly observed device (second device) 10 detected by the directly observed device (first device) 10. In this case, it is possible to calculate a location/posture of the indirectly observed device (second device) 10 relative to the own device on the basis of the estimated location/posture of the directly observed device (first device) 10 and the acquired first environment information.

In addition, in the present embodiment, it is possible not only to estimate the locations/postures of the directly observed devices 10 relative to the target device 10 but also to predict relative locations/postures of first previously observed devices 10 to the target device 10 (previously observed devices when viewed by the target device 10) (such as X3(predicted), X4 (predicted), X6 (predicted), and X7 (predicted) in FIG. 12). This makes it possible to recognize not only the currently observed locations/postures of the directly observed devices 10 but also the locations/postures of the previously observed devices 10 that have been observed in the past.

In addition, in the present embodiment, information on a location/posture of a second previously observed device 10 relative to a directly observed device 10 (previously observed device 10 when viewed by directly observed device 10) is predicted by the directly observed device 10 and is acquired from the directly observed device 10 (such as X7 in the observation table with the ID: 2 in FIG. 12). Next, a location/posture of the second previously observed device relative to the target device 10 (such as X7(from ID: 2) in FIG. 12) is calculated on the basis of the location/posture of the directly observed device 10 relative to the target device 10 and the location/posture of the second directly observed device 10 relative to the directly observed device 10.

This also makes it possible to recognize the location/posture of the previously observed device 10 (second previously observed device 10) that has been observed by the directly observed device 10 in the past.

For example, it is assumed that first environment information of the directly observed device (first device) 10 includes a result of predicting a location/posture of a device serving as a previously observed device for the directly observed device (first device) 10. In this case, it is possible to calculate a location/posture of the device serving as the previously detected device for the first observed device (first device) 10 relative to the own device, on the basis of the estimated location/posture of the directly observed device (first device) 10 and the acquired first environment information.

In addition, in the present embodiment, the locations/postures that have been estimated and predicted by the target device 10 are stored in association with the timestamps (time information) related to the last times when the corresponding devices 10 have been observed. In addition, when the information on the locations/postures that have been estimated and predicted by the directly observed device 10 are acquired from the directly observed device 10, the timestamps (time information) associated with the information on the locations/postures that have been estimated and predicted by the directly observed device 10 are also acquired from the directly observed device 10.

In addition, it is determined whether information on a corresponding location/posture is information older than the predetermined threshold Th (two seconds) on the basis of the timestamp (time information) associated with the information on the location/posture acquired from the directly observed device 10. In the case where the information is the old information, the information on the corresponding location/posture is eliminated. This makes it possible to prevent the integration, addition, or the like in the case where acquired information on location/posture is old. Therefore, it is possible to improve accuracy of the location/posture.

In addition, in the present embodiment, two or more locations/postures corresponding to a same device 10 are integrated into a single location/posture (for example, X3(predicted)+X3(from ID: 1)+X3(from ID: 2), X6(predicted)+X6(from ID: 1), and X7(predicted)+X7(from ID: 2) in FIG. 12). This makes it possible to appropriately integrate the overlapped locations/postures into the single location/posture.

In addition, in the present embodiment, in the case where information on a location/posture corresponding to a same device 10 as a device 10 whose location/posture has been estimated or predicted by the target device 10 is acquired from a directly observed device 10 (according to the first pattern described above), the location/posture that has been estimated or predicted by the target device 10 and a location/posture calculated on the basis of the information on the location/posture acquired from the directly observed device 10 are integrated into a single location/posture (for example, X3(predicted)+X3(from ID: 1)+X3(from ID: 2), X6(predicted)+X6(from ID: 1), and X7(predicted)+X7(from ID: 2) in FIG. 12).

This makes it possible to integrate the overlapped locations/postures into the single location/posture more appropriately.

In addition, in the present embodiment, in the case where respective pieces of information on locations/postures corresponding to a same device 10 are acquired from two or more directly observed device 10 that are different from each other (according to the second pattern), a location/posture calculated on the basis of a piece of the information on the location/posture acquired from one of the directly observed devices 10 and a location/posture calculated on the basis of a piece of information on the location/posture acquired from the other of the directly observed devices 10 are integrated into a single location/posture (such as X3(from ID: 1)+X3 (from ID: 2) in FIG. 12).

This also makes it possible to integrate the overlapped locations/postures into the single location/posture more appropriately.

In addition, in the present embodiment, when integrating two or more locations/postures corresponding to a same device 10 into a single location/posture, it is determined which of the two or more locations/postures to be integrated will be preferentially reflected in the integrated location/posture.

This makes it possible to improve accuracy of the integrated location/posture. Note that, in the present embodiment, such a process of improving accuracy of the integrated location/posture is performed. Therefore, it is possible to improve accuracy of locations/postures in the whole system as the number of devices 10 included in the network increases, for example.

In addition, in the present embodiment, the above-described determination is made on the basis of respective timestamps (time information) corresponding to two or more locations/postures to be integrated. This makes it possible to further improve accuracy of the integrated location/posture.

In addition, in the present embodiment, a location/posture corresponding to a new timestamp (time information) is preferentially reflected in an integrated location/posture rather than a location/posture corresponding an old timestamp. This makes it possible to further improve accuracy of the integrated location/posture.

In addition, in the present embodiment, the integrated location/posture is stored in association with a new timestamp among timestamps (time information) corresponding to two or more locations/postures to be integrated (for example, the timestamp "now" corresponding to X3(predicted)+X3(from ID: 1)+X3(from ID: 2) or the like in FIG. 12). This makes it possible to appropriately update the timestamp.

In addition, in the present embodiment, in the case where information on a location/posture corresponding to a device 10 other than devices 10 whose locations/postures have been estimated or predicted by the target device 10 is acquired from the directly observed device 10, a location/posture calculated on the basis of the acquired location/posture is added and stored as a location/posture corresponding to the new device 10 (such as X5(from ID: 1) in FIG. 12).

This makes it possible to add and store the location/posture of the new device 10 that newly joins the network.

In other words, in the present embodiment, it is assumed that the first environment information of the directly observed device (first device) includes a location/posture of another device relative to the directly observed device (first observed device). A location/posture of the other device is not included in the own second environment information. In this case, it is also possible to treat the other device as a new device and add a location/posture of the new device relative to the own device into the second environment information.

In addition, in the present embodiment, a timestamp (time information) corresponding to the added location/posture is stored in association with the added location/posture (such as the timestamp "now" corresponding to X5(from ID: 1) in FIG. 12). This makes it possible to appropriately store the timestamp corresponding to the new device 10 that newly joins the network.

In addition, in the present embodiment, after the integration and the addition, a location/posture corresponding to a timestamp older than the predetermined threshold Th (such as two seconds) is deleted (such as X4(predicted) in FIG. 12) with reference to respective timestamps (time information) associated with the stored locations/postures. This makes it possible to appropriately delete the old location/posture, and it is possible to improve accuracy of the locations/postures.

In addition, in the present embodiment, in the case where the target device 10 serves as the directly observed device 10 for another device 10, the target device 10 transmits stored information on respective locations/postures and timestamps associated with the locations/postures, to the other device 10 in response to a request from the other device 10 (such as the observation table for communication in FIG. 12). This makes it possible to appropriately transmit various kinds of information (information for the other device 10 to calculate relative locations/postures) to the other device 10 in the case where the target device 10 serves as the directly observed device 10 for the other device 10.

<Modification of First Embodiment>

In the above description, the case of using the IDs allocated to the respective devices 10 to determine whether an acquired location/posture corresponds to a location/posture of a same device 10 in the above-described processes such as the integration, has been described. On the other hand, it is also possible to use information on appearance of observed devices 10 (such as colors, feature of the shapes, SIFT features of the devices 10) instead of the IDs. In this case, devices 10 are considered to be the same in the case where the appearance of the observed devices 10 are the same (for example, the observed devices 10 have the same color and shape).

In addition, it is also possible to determine whether an acquired location/posture corresponds to a location/posture of a same device 10 without using the identification information. For example, in the case where compared locations/postures indicate substantially the same values, these locations/postures are determined to be the locations/postures corresponding to the same device 10.

Second Embodiment

Next, a second embodiment of the present technology will be described. In the first embodiment described above, the present technology has been applied to the head-mounted displays. On the other hand, in the second embodiment, the present technology is applied to a collision avoidance system (in a self-driving system or the like, for example).

Figure 16:
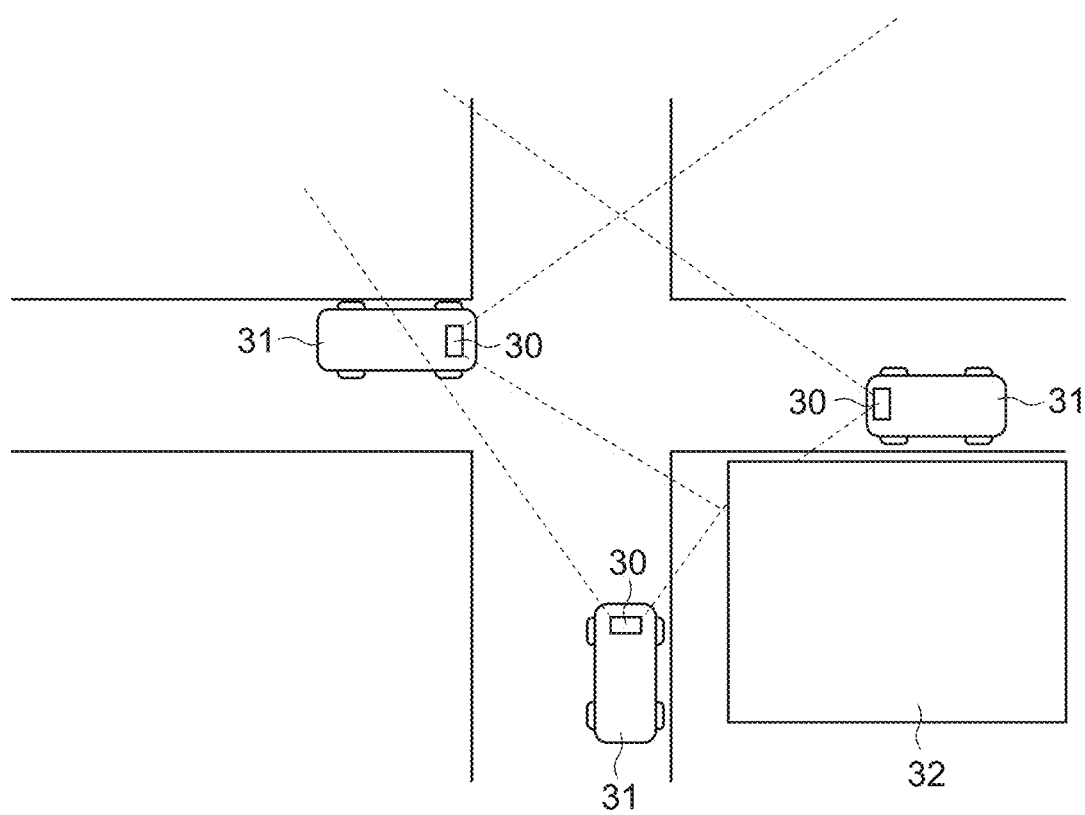
FIG. 16 is a diagram illustrating a collision avoidance system.

FIG. 16 is a diagram illustrating the collision avoidance system. As illustrated in FIG. 16, the collision avoidance system includes in-vehicle devices 30 (examples of the information processing devices) installed in vehicles 31.

The in-vehicle device 30 includes at least imaging units 4, a control unit 1, and a storage unit 2. Note that, the imaging units 4, the control unit 1, and the storage unit 2 are basically similar to the imaging units 4, the control unit 1, and the storage unit 2 of the head-mounted display according to the first embodiment described above (Note that, in the second and subsequent embodiments, the same reference signs as the first embodiment will be used with regard to the imaging units 4, the control unit 1, and the storage unit 2, for descriptive purposes).

FIG. 16 illustrates fields of view of the imaging units 4 in the in-vehicle devices 30. Note that, the in-vehicle device 30 is installed at a position in the vehicle than can be seen from an outside.

Here, the second embodiment uses the vehicles 31 including the in-vehicle devices 3 and running freely, instead of the users wearing the head-mounted displays and moving freely in the first embodiment. In this case, the first embodiment and the second embodiment are substantially the same (although the first embodiment is different from the second embodiment in that locations/postures of other devices 10 are used for the AR display or for the collision avoidance).

The control unit 1 of the in-vehicle device 30 performs processes similar to the processes according to the first embodiment described above.

In FIG. 16, processes performed in the collision avoidance system will be described while using the in-vehicle device 30 (target device 30) installed in a lower vehicle 31 as a reference. Note that, in this example, the processes will be simply described, but all the processes according to the first embodiment are applicable to the second embodiment.

The in-vehicle device 30 in the lower vehicle 31 directly observes an in-vehicle device 30 (directly observed device) in a left vehicle 31 at a current time. Therefore, the in-vehicle device 30 in the lower vehicle 31 estimates a relative location/posture of the in-vehicle device 30 in the left vehicle 31 to the in-vehicle device 30 in the lower vehicle 31.

Note that, there is an shielding object 32 such as a building between the lower vehicle 31 and a right vehicle 31. Therefore, the in-vehicle device 30 in the lower vehicle 31 cannot directly observes the in-vehicle device 30 in the right vehicle 31. Therefore, there is a possibility of collision between the lower vehicle 31 and the right vehicle 31.

On the other hand, the in-vehicle device 30 in the left vehicle 31 directly observes the in-vehicle device 30 in the right vehicle 31 at the current time. Therefore, the in-vehicle device 30 in the left vehicle 31 estimates a relative location/posture of the in-vehicle device 30 in the right vehicle 31 to the in-vehicle device 30 in the left vehicle 31.

The in-vehicle device 30 in the lower vehicle 31 acquires information on the relative location/posture of the in-vehicle device 30 in the right vehicle 31 to the in-vehicle device 30 in the left vehicle 31, from the in-vehicle device 30 in the left vehicle 31. Next, the in-vehicle device 30 in the lower vehicle 31 calculates a relative location/posture of the in-vehicle device 30 in the right vehicle 31 to the in-vehicle device 30 in the lower vehicle 31, on the basis of the relative location/posture of the in-vehicle device 30 (directly observed device 30) in the left vehicle 31 to the in-vehicle device 30 (target device 30) in the lower vehicle 31 and the relative location/posture of the in-vehicle device 30 (indirectly observed device 30) in the right vehicle 31 to the in-vehicle device 30 in the left vehicle 31.

This allows the in-vehicle device 30 in the lower vehicle 31 to recognize the location/posture of the in-vehicle device 30 in the right vehicle 31, which cannot be observed actually. This makes it possible to prevent collision between the lower vehicle 31 and the right vehicle 31.

<Modification of Second Embodiment>

Next, a modification of the second embodiment will be described. In the second embodiment described above, the information processing devices according to the present technology are installed only in the vehicles 31. On the other hand, in the modification of the second embodiment, the information processing devices according to the present technology are installed not only in the vehicles 31 but also in traffic lights 41.

Figure 17:
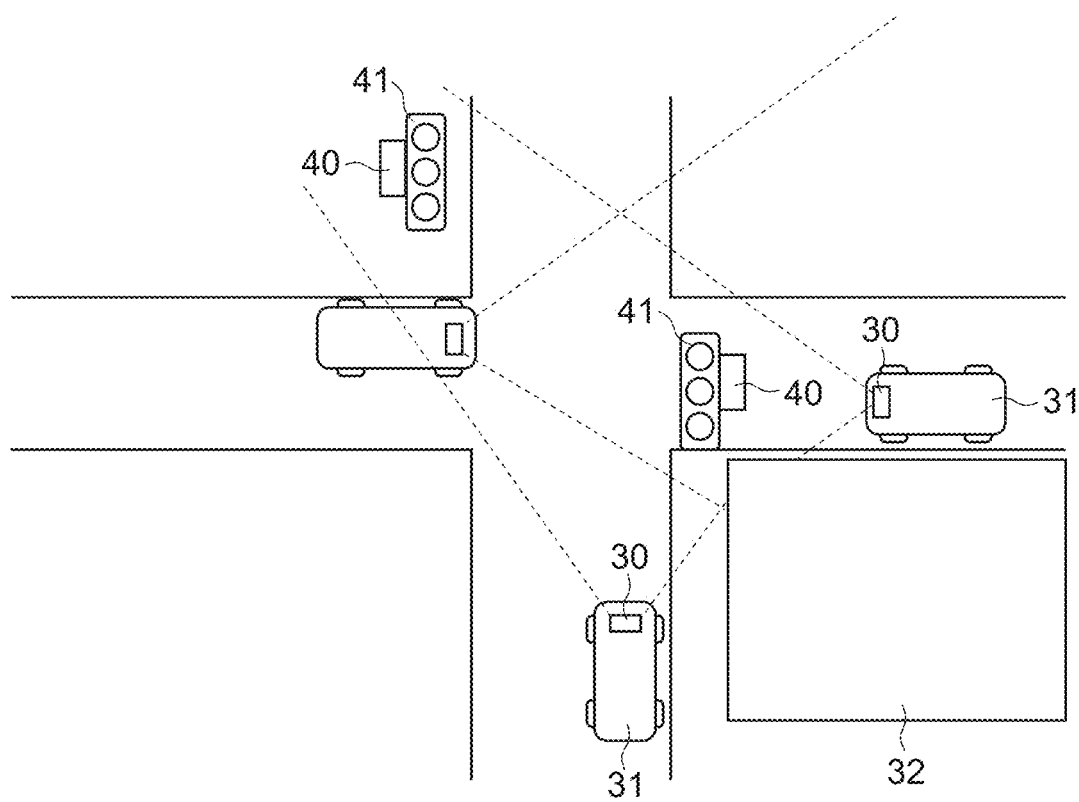
FIG. 17 is a diagram illustrating another example of the collision avoidance system.

FIG. 17 is a diagram illustrating another example of the collision avoidance system. As illustrated in FIG. 17, the collision avoidance system includes the in-vehicle devices 30 installed in the vehicles 31 and traffic-light-installed devices 40 (an example of the information processing device) installed in the traffic lights 41.

The in-vehicle devices 30 according to the modification are similar to the in-vehicle devices 30 according to the second embodiment described above. The traffic-light-installed device 40 includes at least an imaging unit 4, a control unit 1, and a storage unit 2. Note that, the imaging unit 4, the control unit 1, and the storage unit 2 are basically similar to the imaging units 4, the control unit 1, and the storage unit 2 of the head-mounted display according to the first embodiment described above.

FIG. 17 illustrates fields of view of the imaging units 4 in the in-vehicle devices 30. Note that, FIG. 17 does not illustrate fields of view of the imaging units 4 in the traffic-light-installed devices 40. However, for example, these fields of view cover 360 degrees (it is sufficient for these fields of view to be capable of capturing images of at least a road). Note that, the in-vehicle devices 30 and the traffic-light-installed devices 40 are installed at positions that can be seen from the outside.

Here, the modification of the second embodiment uses the vehicles 30 including the in-vehicle devices 3 and running freely, instead of the users wearing the head-mounted displays and moving freely according to the first embodiment. In addition, the modification of the second embodiment uses the traffic lights 41 including the traffic-light-installed devices 40 and running freely, instead of the users who wears the head-mounted displays but does not move according to the first embodiment. In this case, the first embodiment and the second embodiment are substantially the same (although the first embodiment is different from the second embodiment in that locations/postures of other devices are used for the AR display or for the collision avoidance).

The control units 1 of the in-vehicle devices 30 and the control units 1 of the traffic-light-installed devices 40 perform processes similar to the processes according to the first embodiment described above.

In FIG. 17, processes performed in the collision avoidance system will be described while using an in-vehicle device 30 (target device 30) installed in a lower vehicle 31 as a reference. Note that, in this example, the processes will be simply described, but all the processes according to the first embodiment are applicable to the modification of the second embodiment.

The in-vehicle device 30 in the lower vehicle 31 directly observes three devices including the in-vehicle device 30 in the left vehicle 31, the traffic-light-installed device 40 in a left traffic light 41, and the traffic-light-installed device 40 in a right traffic light 41 at a current time. Therefore, the in-vehicle device 30 in the lower vehicle 31 estimates relative locations/postures of the respective three devices to the own device.

In addition, the in-vehicle device 30 in the left vehicle 31 directly observes two devices 10 including the traffic-light-installed device 40 in the right traffic light 41 and the in-vehicle device 30 in the right vehicle 31 at the current time. Therefore, the in-vehicle device 30 in the left vehicle 31 estimates relative locations/postures of the two respective devices to the in-vehicle device 30 in the left vehicle 31.

In addition, at the current time, the traffic-light-installed device 10 in the left traffic light 41 directly observes four devices including the traffic-light-installed device 40 in the right traffic light 41 and the in-vehicle devices 30 in all the three vehicles 31. Therefore, the traffic-light-installed device 40 in the left traffic light 41 estimates relative locations/postures of the four respective devices to the traffic-light-installed device 40 in the left traffic light 41.

In addition, at the current time, the traffic-light-installed device 10 in the right traffic light 41 directly observes four devices including the traffic-light-installed device 40 in the left traffic light 41 and the in-vehicle devices 30 in all the three vehicles 31. Therefore, the traffic-light-installed device 40 in the right traffic light 41 estimates relative locations/postures of the four respective devices to the traffic-light-installed device 40 in the right traffic light 41.

Note that, the location/posture of the traffic-light-installed device 40 in the left traffic light 41 relative to the traffic-light-installed device 40 in the right traffic light 41, and the location/posture of the traffic-light-installed device 40 in the right traffic light 41 relative to the traffic-light-installed device 40 in the left traffic light 41 are basically fixed (because the traffic-light-installed devices 40 do not move). Therefore, it is not necessary to calculate such locations/postures on a short cycle each time. Such locations/postures may be calculated on a relatively long cycle (such as once a day).

The in-vehicle device 30 in the lower vehicle 31 acquires information on the respective locations/postures estimated by the in-vehicle device 30 in the left vehicle 31, the traffic-light-installed device 40 in the left traffic light 41, and the traffic-light-installed device 40 in the right traffic light 41, from these devices 10.

Next, the in-vehicle device 30 in the lower vehicle 31 calculates (1) a relative location/posture of the in-vehicle device 30 in the right vehicle 31 to the in-vehicle device 30 in the lower vehicle 31, on the basis of the relative location/posture of the in-vehicle device 30 (directly observed device 30) in the left vehicle 31 to the in-vehicle device 30 (target device 30) in the lower vehicle 31 and the relative location/posture of the in-vehicle device 30 (indirectly observed device 30) in the right vehicle 31 to the in-vehicle device 30 in the left vehicle 31.

In addition, the in-vehicle device 30 in the lower vehicle 31 calculates (2) a relative location/posture of the in-vehicle device 30 in the right vehicle 31 to the in-vehicle device 30 in the lower vehicle 31, on the basis of the relative location/posture of the traffic-light-installed device 40 (directly observed device 40) in the left traffic light 41 to the in-vehicle device 30 (target device 30) in the lower vehicle 31 and the relative location/posture of the in-vehicle device 30 (indirectly observed device 30) in the right vehicle 31 to the traffic-light-installed device 40 in the left traffic light 41.

In addition, the in-vehicle device 30 in the lower vehicle 31 calculates (3) a relative location/posture of the in-vehicle device 30 in the right vehicle 31 to the in-vehicle device 30 in the lower vehicle 31, on the basis of the relative location/posture of the traffic-light-installed device 40 (directly observed device 40) in the right traffic light 41 to the in-vehicle device 30 (target device 30) in the lower vehicle 31 and the relative location/posture of the in-vehicle device 30 (indirectly observed device 30) in the right vehicle 31 to the traffic-light-installed device 40 in the right traffic light 41.

Note that, the locations/postures (1), (2), and (3) overlap each other as locations/postures of the single device. Therefore, these locations/postures are integrated.

In a way similar to the second embodiment, the in-vehicle device 30 in the lower vehicle 31 according to the modification of the second embodiment is also capable of recognizing the location/posture of the in-vehicle device 30 in the right vehicle 31, which cannot be observed actually. This makes it possible to prevent collision between the lower vehicle 31 and the right vehicle 31.

In addition, in the modification of the second embodiment, the traffic-light-installed devices 40 are installed in the traffic lights 41. This allows traffic-light-installed devices 40 to always observe other devices 30 (vehicles 31) at an intersection. This makes it possible to prevent collision between the vehicles 31 more effectively.

Note that, the traffic-light-installed device 40 may acquire information on locations/postures (of in-vehicle devices 30) from another traffic-light-installed device 40 that is not directly observed, in addition to acquiring information on locations/postures (of in-vehicle devices 30) from another traffic-light-installed device 40 that is directly observed by the own traffic-light-installed device 40. In this case, it is possible to share the locations/postures between distant places.

In addition, in the case where the in-vehicle device 30 observes two traffic-light-installed devices 40 simultaneously, it is also possible for the in-vehicle device 30 to improve accuracy of estimation and prediction of locations/postures on the basis of information on the unchanged relative locations/postures of the two traffic-light-installed devices 40 (in this case, information such as covariance is communicated).

Third Embodiment

Next, a third embodiment of the present technology will be described. In the third embodiment, a case where the present technology is applied to a formation flying system of flying objects 50 such as drones will be described.

Figure 18:
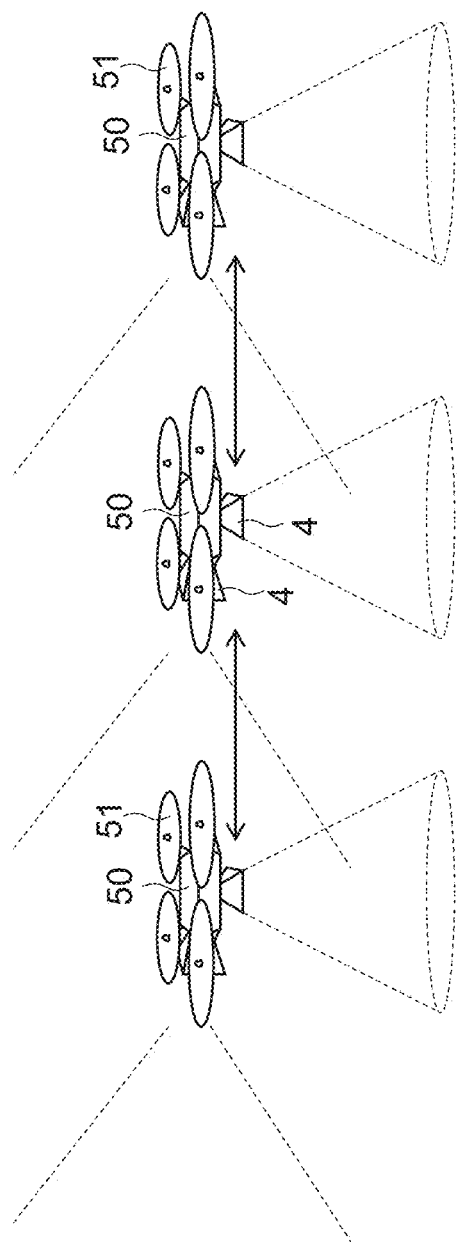
FIG. 18 is a diagram illustrating a formation flying system.

FIG. 18 is a diagram illustrating the formation flying system according to the third embodiment. As illustrated in FIG. 18, the formation flying system includes a plurality of the flying objects 50 (an example of the information processing devices).

The flying object 50 includes at least propellers 51, imaging units 4, a control unit 1, and a storage unit 2. Note that, the imaging units 4, the control unit 1, and the storage unit 2 are basically similar to the imaging units 4, the control unit 1, and the storage unit 2 of the head-mounted display according to the first embodiment described above.

FIG. 18 illustrates fields of view of the imaging units 4 in the flying objects 50. For example, the imaging units 4 are installed at any positions on the flying object 50 from right to left or up and down (in the example illustrated in FIG. 18, the imaging units 4 are installed on the left side and the bottom side of the flying object 50).

The control unit 1 of the flying object 50 performs processes similar to the processes according to the first embodiment described above.

In FIG. 18, processes performed by the formation flying system will be described while using a right flying object 50 as a reference (target device 50). Note that, in this example, the processes will be simply described, but all the processes according to the first embodiment are applicable to the third embodiment.

At a current time, the right flying object 50 directly observes a middle flying object 50. Therefore, the right flying object 50 estimates a relative location/posture of the middle flying object 50 to the right flying object 50.

On the other hand, at the current time, the middle flying object 50 directly observes a left flying object 50. Therefore, the middle flying object 50 estimates a relative location/posture of the left flying object 50 to the middle flying object 50.

The right flying object 50 acquires information on the relative location/posture of the left flying object 50 to the middle flying object 50 from the middle flying object 50. Next, the right flying object 50 calculates a relative location/posture of the left flying object 50 to the right flying object 50 on the basis of the relative location/posture of the middle flying object 50 (directly observed object 50) to the right flying object (target device 50) and the relative location/posture of the left flying object 50 (indirectly observed device 50) to the middle flying object 50.

As described above, also in the third embodiment, the series of "observations" forms a network for sharing the locations/postures. Therefore, if there is no central unit such as a server, it is also possible for the respective flying objects 50 to independently determine their own behavior in formation flying on the basis of locations/postures of other flying objects 50 held by themselves. Therefore, it is possible for a group of the flying objects 50 to fly independently and autonomously without a central unit such as a server.

In addition, even in the case where one of the flying objects 50 malfunctions, the network is formed variably. Therefore, the other normal flying objects 50 can form an appropriate network. This makes it possible to reduce the possibility of network disruption of the whole system and the impossibility of the formation flying.

Note that, the present technology may be applied to a formation march system such as autonomous walking robots.

<<Various Modifications>>

The cases where the locations/postures are propagated and shared between the respective devices 10, 30, 40, and 50 have been described above. Alternatively, information other than the locations/postures may also be propagated and shared between the respective devices 10, 30, 40, and 50 in addition to the locations/postures.

Figure 19:
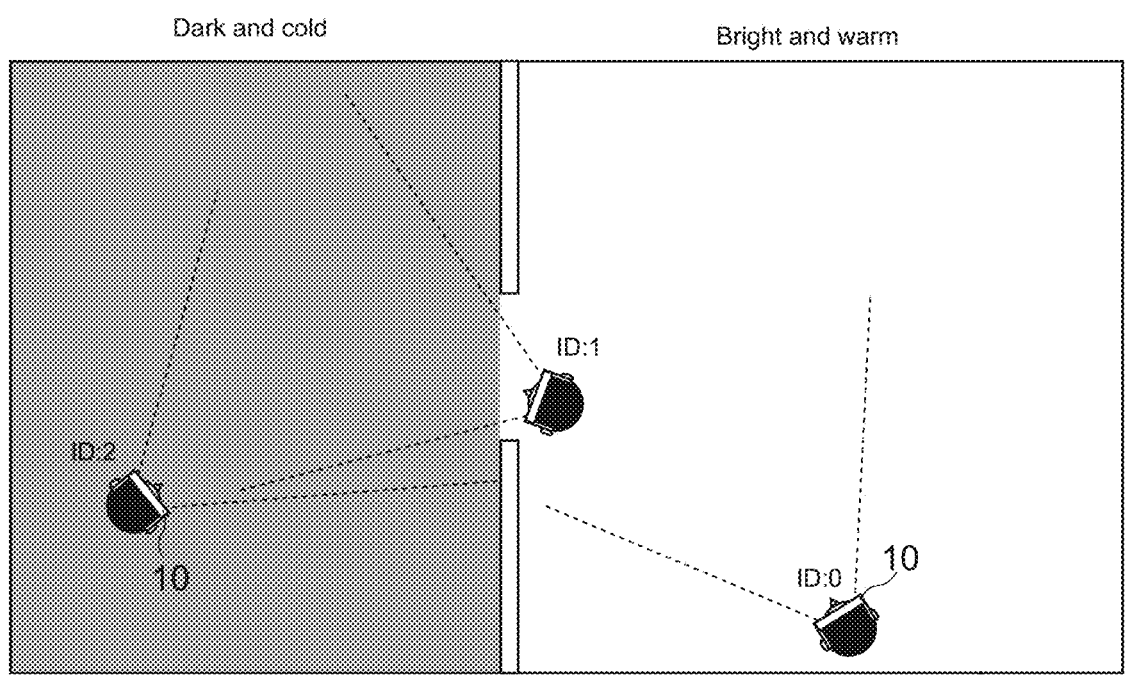
FIG. 19 is a diagram illustrating an example in which the information processing devices propagate and share locations/postures and information other than the locations/postures.

FIG. 19 is a diagram illustrating an example in which the devices 10 (head-mounted displays 10) propagate and share locations/postures and information other than the locations/postures. In the example illustrated in FIG. 19, the respective devices 10 propagate and share information on "brightness" and "temperature" in addition to the locations/postures.

In the example illustrated in FIG. 19, each of the devices 10 includes an illuminance sensor for measuring brightness around the device 10. In addition, each of the devices 10 includes a temperature sensor for measuring temperature around the device 10. In addition, each of the devices 10 acquires temperature information and brightness information measured by other observed devices 10 (directly observed devices 10) (and temperature information and brightness information acquired by the other devices 10 from yet other devices 10) from the other observed devices 10 in addition to the information on locations/postures.

The environment information (first and second environment information) may include ambient information detected by each of the devices 10. Examples of the ambient information include the above-described temperature information, brightness information, and the like. Of course, the environment information may include other information related to surroundings, and the environment information may be propagated and shared by the respective devices 10.

This allows each of the devices 10 to recognize brightness and temperature at respective locations of other devices 10 that form a network with the own device 10 through a series of observations. Therefore, it is possible for the respective devices 10 to recognize distribution of brightness and temperature in a space.

Here, in the example illustrated in FIG. 19, a left room is dark but a right room is bright. In this case, information on brightness (dark) measured by the device 10 with the ID: 2 in the dark room is propagated to the device 10 with the ID: 0 via the device 10 with the ID: 1. In a similar way, information on brightness (bright) measured by the device 10 with the ID: 0 in the bright room is propagated to the device 10 with the ID: 2 via the device 10 with the ID: 1.

For example, pieces of information on distribution of brightness in the space are held by the respective devices 10 and the pieces of information are used for autoexposure of the imaging units 4. For example, in FIG. 19, it is assumed that a user who wears the device 10 with the ID: 0 and who is in the right bright room moves to the left dark room. In this case, the device 10 with the ID: 1 has already recognized that the left room has been dark. Therefore, the device 10 with the ID: 0 is capable of achieve quick autoexposure depending on a degree of darkness in the left room when the user wearing the device 10 with the ID: 0 moves to the left room.

In addition, the pieces of information on distribution of brightness in the space held by the respective devices 10 may be used for the Internet of things (IoT). For example, in the example illustrated in FIG. 19, the user wearing the device 10 with the ID: 0 is in the left room but the left room is dark. Therefore, it is possible to turn on a light in the left room.

In addition, in the example illustrated in FIG. 19, the left room is cold but the right room is warm. In this case, information on temperature (low temperature) measured by the device 10 with the ID: 2 in the cold room is propagated to the device 10 with the ID: 0 via the device 10 with the ID: 1. In a similar way, information on temperature (high temperature) measured by the device 10 with the ID: 0 in the warm room is propagated to the device 10 with the ID: 2 via the device 10 with the ID: 1.

The information on distribution of temperature in the space held by the respective devices 10 may be used for the Internet of things (IoT). For example, in the example illustrated in FIG. 19, the user wearing the device 10 with the ID: 2 is in the left room but the left room is cold. Therefore, it is possible to turn up set temperature of an air conditioner in the left room.

Here, it is also assumed that a remote device 10 operates equipment such as the light or the air conditioner on the basis of the information on brightness, temperature, and the like held by the respective devices 10. For example, the remote device 10 is capable of recognizing brightness and temperature at any location via the network. The remote device 10 provides the user with the brightness and temperature at any location via the display unit 3.

On the basis of the displayed brightness and temperature, the user adjusts brightness of the light (ON/OFF), the set temperature of the air conditioner, or the like (instead of the user, it is also possible for the device 10 to autonomously adjust the brightness, temperature, and the like. In this case, it is not necessary to display the brightness, temperature, or the like). Accordingly, information on such an instruction is successively transmitted from device 10 to device 10 via the network, and is received by a device 10 located close to the light or the air conditioner serving as a control target.

The device 10 transmits the instruction to the light or the air conditioner serving as the control target. This makes it possible to adjust the brightness of the light or the temperature of the air conditioner. s In the example illustrated in FIG. 19, the illuminance sensor and the temperature sensor are installed in the device 10 itself. However, the illuminance sensor and the temperature sensor may be fixed to a certain position in the rooms. In this case, it is sufficient for the device 10 to acquire the information on brightness and temperature from the illuminance sensor and the temperature sensor near the device 10 (observation of the sensors is not necessary).

In FIG. 19, the head-mounted displays 10 propagate and share the information other than locations/postures. However, the information other than locations/postures may be propagated and shared by the in-vehicle devices 30, the traffic-light-installed devices 40, the flying objects 50, or the like.

Here, it may be possible for a device 10, 30, 40, or 50 to control other devices 10, 30, 40, or 50 via the network. For example, it is assumed that, among the plurality of flying objects 50 that achieve formation flying, an arbitrary flying object 50 instructs another flying object 50 to move to another location. In this case, information on the instruction transmitted from the arbitrary flying object 50 is successively transmitted from flying object 50 to flying object 50 via the network, and the transmitted information on the instruction is received by a flying object 50 serving as a control target. The flying object 50 serving as the control target moves to the other location on the basis of the received instruction.

The present technology may also be configured as below.

(1) An information processing device including
a control unit that
estimates a location/posture of a first device detected from a captured image,
acquires first environment information of the first device from the detected first device, and
generates second environment information on the basis of the estimated location/posture of the first device and the acquired first environment information.

(2) The information processing device according to (1), in which
the first environment information includes a location/posture of a device other than the first device relative to the first device, and
the second environment information includes a location/posture of another device relative to an own device.

(3) The information processing device according to (1) or (2), in which
the first environment information includes a location/posture of a second device detected by the first device, and
the control unit calculates a location/posture of the second device relative to the own device on the basis of the estimated location/posture of the first device and the acquired first environment information.

(4) The information processing device according to any one of (1) to (3), in which
the control unit predicts a location/posture of a previously detected device that is previously detected as the first device but that is not currently detected, and
the second environment information includes the predicted location/posture of the previously detected device.

(5) The information processing device according to (4), in which
the first environment information includes a location/posture of a device serving as the previously detected device for the first device, and
the control unit calculates a location/posture of the device serving as the previously detected device for the first device relative to the own device, on the basis of the estimated location/posture of the first device and the acquired first environment information.

(6) The information processing device according to any one of (1) to (5), in which
the second environment information includes time information associated with a location/posture of the other device relative to the own device, and
the control unit determines whether or not to eliminate the location/posture of the other device relative to the own device from the second environment information on the basis of the time information.

(7) The information processing device according to any one of (1) to (6),
in which the control unit integrates two or more locations/postures of another device relative to the own device.

(8) The information processing device according to (7), in which the control unit determines which of the two or more locations/postures of the other device relative to the own device will be preferentially reflected in an integrated location/posture relative to the own device.

(9) The information processing device according to (8), in which
the second environment information includes time information associated with a location/posture of the other device relative to the own device, and
the control unit makes the determination on the basis of the time information.

(10) The information processing device according to (9), in which the control unit preferentially reflects a location/posture that is relative to the own device and that is associated with new time information, rather than a location/posture that is relative to the own device and that is associated with old time information.

(11) The information processing device according to any one of (7) to (10), in which
the environment information includes time information associated with a location/posture of the other device relative to the own device, and
the control unit associates the integrated location/posture of the own device with a newest piece of time information among pieces of time information associated with the two or more locations/postures relative to the own device.

(12) The information processing device according to any one of (1) to (11),
in which, in the case where the acquired first environment information includes a location/posture of another device relative to the first device but the second environment information does not includes a location/posture of the other device relative to the own device, the control unit treats the other device as a new device and adds the location/posture of the new device relative to the own device into the second environment information.

(13) The information processing device according to any one of (1) to (12),
in which the control unit transmits the second environment information to the other device in response to a request from the other device.

(14) The information processing device according to any one of (1) to (13),
in which the second environment information includes ambient information detected by the other device.

(15) The information processing device according to (14), in which the ambient information includes at least one of temperature information or brightness information.

(16) An information processing method including
estimating a location/posture of a first device detected from a captured image,
acquiring first environment information of the first device from the detected first device, and
generating second environment information on the basis of the estimated location/posture of the first device and the acquired first environment information.

(17) A program that causes a computer to function as a control unit that
estimates a location/posture of a first device detected from a captured image,
acquires first environment information of the first device from the detected first device, and
generates second environment information on the basis of the estimated location/posture of the first device and the acquired first environment information.

REFERENCE SIGNS LIST 1 control unit
10 information processing device
30 in-vehicle device
40 traffic-light-installed device
50 flying object

The invention claimed is:

1. An information processing device, comprising:
circuitry configured to:
detect a first device from an image;
estimate at least one of a location or a posture of the first device;
acquire, from the first device, first environment information of the first device, wherein
the first environment information includes at least one of a first location or a first posture of a second device,
the second device is detected by the first device, and
the second device is out of a field of view of the information processing device;
calculate at least one of a second location or a second posture of the second device relative to the information processing device, based on the estimated at least one of the location or the posture of the first device and the acquired first environment information;
generate second environment information based on the at least one of the second location or the second posture of the second device and the estimated at least one of the location or the posture of the first device,
wherein the second environment information includes first time information associated with the at least one of the second location or the second posture of the second device; and
determine, based on the first time information, elimination of the at least one of the second location or the second posture of the second device from the second environment information.

2. The information processing device according to claim 1, wherein
the first environment information further includes at least one of a location or a posture of a third device relative to the first device, and
the second environment information further includes at least one of a location or a posture of a fourth device relative to the information processing device.

3. The information processing device according to claim 1, wherein
the circuitry is further configured to predict at least one of a location or a posture of a previously detected device that is previously detected as the first device but that is not currently detected, and
the second environment information further includes the predicted at least one of the location or the posture of the previously detected device.

4. The information processing device according to claim 3, wherein
the first environment information further includes the at least one of the first location or the first posture of the second device that serves as the previously detected device for the first device, and the circuitry is further configured to calculate, based on the estimated at least one of the location or the posture of the first device and the acquired first environment information, the at least one of the second location or the second posture of the second device that serves as the previously detected device.

5. The information processing device according to claim 1, wherein the circuitry is further configured to integrate at least one of:
a plurality of locations of a third device relative to the information processing device, or
a plurality of postures of the third device relative to the information processing device.

6. The information processing device according to claim 5, wherein the circuitry is further configured to determine at least one of:
a first location of the plurality of locations of the third device that is reflected in an integrated location relative to the information processing device, or
a first posture of the plurality of postures of the third device that is reflected in an integrated posture relative to the information processing device.

7. The information processing device according to claim 6, wherein
the second environment information further includes second time information associated with the plurality of locations or the plurality of postures of the third, and
the circuitry is further configured to determine, based on the second time information, the at least one of the first location or the first posture of the third device.

8. The information processing device according to claim 7, wherein
the circuitry is further configured to reflect the at least one of the first location or the first posture of the third device that is relative to the information processing device and that is associated with new time information, than at least one of a second location of the plurality of locations or a second posture of the plurality of postures of the third device, and
the at least one of the second location or the second posture of the third device is relative to the information processing device and is associated with old time information.

9. The information processing device according to claim 6, wherein
the second environment information further includes second time information associated with the plurality of locations or the plurality of postures of the third device, and
the circuitry is further configured to associate at least one of the integrated location or the integrated posture with a newest piece of the second time information among pieces of the second time information.

10. The information processing device according to claim 1, wherein, in a case where the acquired first environment information includes at least one of a first location or a first posture of a third device relative to the first device but the second environment information does not include at least one of a second location or a second posture of the third device relative to the information processing device, the circuitry is further configured to determine the third device as a new device and add the at least one of the second location or the second posture of the new device relative to the information processing device into the second environment information.

11. The information processing device according to claim 1, wherein the circuitry is further configured to transmit the second environment information to the first device based on a request from the first device.

12. The information processing device according to claim 1, wherein the second environment information further includes ambient information detected by the second device.

13. The information processing device according to claim 12, wherein the ambient information includes at least one of temperature information or brightness information.

14. An information processing method, comprising:
in an information processing device:
detecting a first device from an image;
estimating at least one of a location or a posture of the first device;
acquiring, from the first device, first environment information of the first device, wherein
the first environment information includes at least one of a first location or a first posture of a second device,
the second device is detected by the first device, and
the second device is out of a field of view of the information processing device;
calculating at least one of a second location or a second posture of the second device relative to the information processing device, based on the estimated at least one of the location or the posture of the first device and the acquired first environment information;
generating second environment information based on the at least one of the second location or the second posture of the second device and the estimated at least one of the location or the posture of the first device,
wherein the second environment information includes time information associated with the at least one of the second location or the second posture of the second device; and
determining, based on the time information, elimination of the at least one of the second location or the second posture of the second device from the second environment information.

15. A non-transitory computer-readable medium having stored thereon, computer-executable instructions which, when executed by a processor of an information processing device, cause the processor to execute operations, the operations comprising:
detecting a first device from an image;
estimating at least one of a location or a posture of the first device;
acquiring, from the first device, first environment information of the first device, wherein
the first environment information includes at least one of a first location or a first posture of a second device,
the second device is detected by the first device, and
the second device is out of a field of view of the information processing device;
calculating at least one of a second location or a second posture of the second device relative to the information processing device, based on the estimated at least one of the location or the posture of the first device and the acquired first environment information;
generating second environment information based on the at least one of the second location or the second posture of the second device and the estimated at least one of the location or the posture of the first device, wherein the second environment information includes time information associated with the at least one of the second location or the second posture of the second device; and determining, based on the time information, elimination of the at least one of the second location or the second posture of the second device from the second environment information.

16. An information processing device, comprising:
circuitry configured to:
  detect a first device from an image;
  estimate at least one of a location or a posture of the first device;
  acquire, from the first device, first environment information of the first device, wherein
    the first environment information includes at least one of a first location or a first posture of a second device,
    the second device is detected by the first device, and
    the second device is out of a field of view of the information processing device;
  calculate at least one of a second location or a second posture of the second device relative to the information processing device, based on the estimated at least one of the location or the posture of the first device and the acquired first environment information;
  generate second environment information based on the at least one of the second location or the second posture of the second device and the estimated at least one of the location or the posture of the first device;
  integrate at least one of:
    a plurality of locations of a third device relative to the information processing device, or
    a plurality of postures of the third device relative to the information processing device; and
  determine at least one of:
    a first location of the plurality of locations of the third device that is reflected in an integrated location relative to the information processing device, or
    a first posture of the plurality of postures of the third device that is reflected in an integrated posture relative to the information processing device.

* * * * *